United States Patent [19]

Suzuki et al.

[11] Patent Number: 4,699,488
[45] Date of Patent: Oct. 13, 1987

[54] MOTORIZED DRIVE DEVICE FOR CAMERA

[75] Inventors: Masayuki Suzuki, Yokohama; Tsunemasa Ohara; Yoichi Tosaka, both of Tokyo; Masaharu Kawamura, Kawasaki; Yoshihito Harada, Yokohama; Ryuichi Kobayashi, Kawasaki, all of Japan

[73] Assignee: Canon Kabushiki Kaisha, Tokyo, Japan

[21] Appl. No.: 912,051

[22] Filed: Sep. 25, 1986

[30] Foreign Application Priority Data

Sep. 27, 1985 [JP] Japan .............................. 60-212093
Sep. 27, 1985 [JP] Japan .............................. 60-212094

[51] Int. Cl.$^4$ .............................................. G03B 1/18
[52] U.S. Cl. .............................................. 354/173.11
[58] Field of Search ................ 354/412, 173.1, 173.11, 354/204–206, 213, 214

[56] References Cited

U.S. PATENT DOCUMENTS

| 4,086,603 | 4/1978 | Kozuki et al. | 354/266 X |
| 4,272,173 | 6/1981 | Iwashita et al. | 354/173.11 |
| 4,351,595 | 9/1982 | Date et al. | 354/173.11 |
| 4,431,292 | 2/1984 | Takahashi | 354/173.11 |
| 4,443,084 | 4/1984 | Harada et al. | 354/173.11 |
| 4,455,075 | 6/1984 | Iwashita et al. | 354/173.1 |
| 4,572,637 | 2/1986 | Inoue | 354/173.11 |
| 4,616,913 | 10/1986 | Suzuki et al. | 354/173.1 |
| 4,647,169 | 3/1987 | Suzuki et al. | 354/173.1 |

FOREIGN PATENT DOCUMENTS 123828 7/1985 Japan .............................. 354/173.11

Primary Examiner—W. B. Perkey
Attorney, Agent, or Firm—Robin Blecker & Daley

[57] ABSTRACT

A motorized drive device for a camera comprising an electric motor and a transmission system operating with selection of at least two speed change ratios. The operation of the motor is controlled in such a way that the time point for the start of output of a stop signal for the motor alters depending on which speed change ratio is selected.

18 Claims, 23 Drawing Figures

FIG.9

| REGISTER RL | | | | HEXA-DECIMAL | MODE |
|---|---|---|---|---|---|
| 4 | 3 | 2 | 1 | | |
| 0 | 0 | 0 | 0 | 00H | SINGLE SHOOTING HIGH SPEED |
| 0 | 1 | 0 | 0 | 04H | SINGLE SHOOTING AUTOMATIC SPEED CHANGE |
| 0 | 0 | 0 | 0 | 01H | CONTINUOUS SHOOTING HIGH SPEED |
| 0 | 1 | 0 | 1 | 05H | CONTINUOUS SHOOTING AUTOMATIC SPEED CHANGE |
| 0 | 0 | 1 | 0 | 02H | CONTINUOUS SHOOTING LOW SPEED |
| 1 | 0 | 1 | 0 | 0AH | SELF-TIMER 10 SEC. |
| 1 | 0 | 1 | 1 | 0BH | SELF-TIMER 2 SEC. |

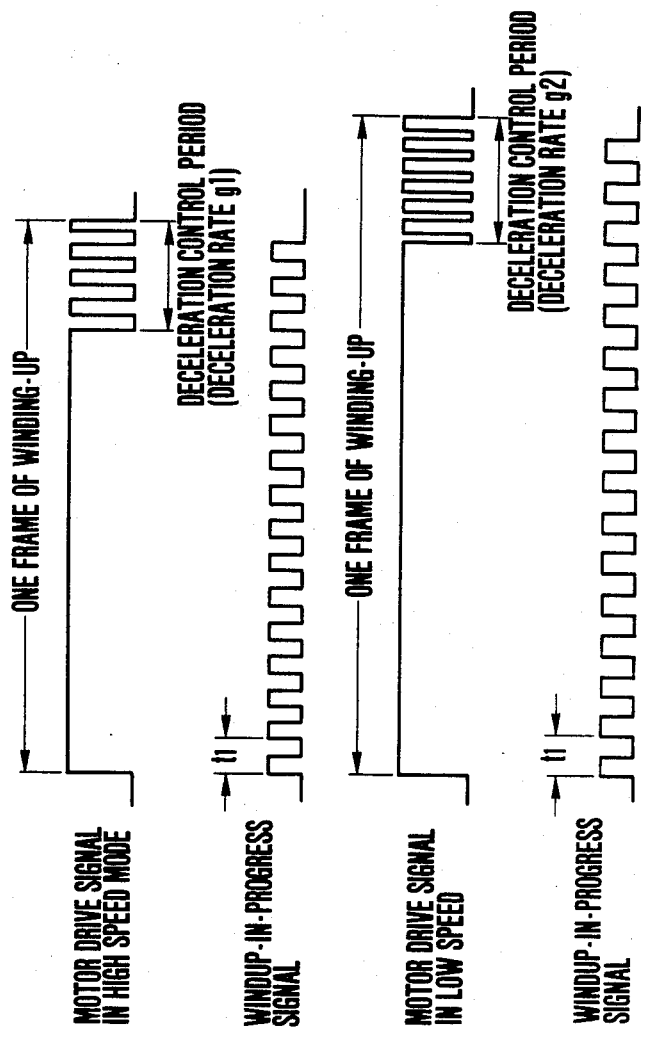
F I G. 21

MOTORIZED DRIVE DEVICE FOR CAMERA

BACKGROUND OF THE INVENTION

1. Field of the Invention

This invention relates to motorized drive device for cameras comprising an electric motor and a transmission system operating with selection of at least two speed change ratios.

2. Description of the Related Art

Recently, the automatic drive device by a motor has been widely used in cameras. For the charging of the shutter and the lens, and the winding-up and rewinding of film are driven by a single motor or a plurality of motors, a great improvement of the manageability has been achieved. In such a trend, it has been proposed that the windup transmission system and other like systems each have a plurality of speed reduction ratios, and these speed reduction ratios are selectively set automatically depending on the state of the electrical power source, the state of load, and other situations, so that the motor is driven under optimum condition, in the U.S. patent application Ser. Nos. 889,087, 865,063 and 855,799 assigned to the assignee of the present invention. The use of such a device or even another one in which a desired speed reduction ratio is selected by the photographer enables the mechanical stopping measures to be omitted when the motor is stopped by electrically detecting the completion of winding-up or the completion of the charging. But, the motor is rotating at a very high speed and cannot stop suddenly when the stop signal is given. So, it takes some time to stably stop an object to be driven as measured from the moment at which the stop signal for the motor has appeared. In that case, because different speed reduction ratios of the transmission system have different inertias of the transmission system including the motor, the time from the stop signal for the motor to the stop of the object to be driven and the distance the object overruns differ with different speed reduction ratios. In other words, for the speed reduction ratio to the high speed, the inertia is small and the time till the stop is short, but the overrun distance is long. For the case of the speed reduction ratio for the low speed, the inertia is small, and the stopping time is long, but the overrun distance is short. If the overrun distance is long, many drawbacks arise. For example, the charge system results in overcharging its load.

Also, as a countermeasure against the difference in the stopping time or stabilization time based on the above-described fact of the difference of speed reduction ratio, a room for surplus of the stabilization time must be created, and, upon having waited for the elapse of this longer time than whichever stabilization time is longer, the next operation must be permitted to follow. This has a large influence particularly on taking a series of continuous shots (continuous shooting). That is, if a time long enough to assure the possible maximum stabilization time is allowed to elapse before the next cycle of shutter opening operation starts, though the camera has no mechanical problems, it becomes impossible to take many shots per unit time. Conversely, if a transition to the shutter opening operation is allowed to take place before the stopping of the film in the preceding cycle of winding operation is stabilized, the image on the film will be blurred, or the shutter mechanism will become unable to be charged, or damaged.

SUMMARY OF THE INVENTION

An object of the invention is to provide an improved motorized drive device for a camera having a transmission system whose speed reduction ratio is changeable.

Concrete improvements according to the present invention will become apparent from the following detailed description.

BRIEF DESCRIPTION OF THE DRAWINGS

FIGS. 1 to 12 illustrate an embodiment of the invention.

FIG. 1 is a front view of the camera.

FIG. 2 is a top view of the same, broken away in part to show interior detail.

FIG. 3 is a perspective view of a charge transmission system.

FIG. 4 is a perspective view of a windup transmission system.

FIG. 5 is a perspective view of a rewind transmission system.

FIG. 6 is an electrical circuit diagram of a microcomputer and peripheral circuits.

FIG. 7 is an electrical circuit diagram of a drive circuit.

FIG. 8 is a block diagram of a decoder and a display device.

FIG. 9 is a table for codes of modes.

FIGS. 10, 10(A), 10(B), 11 and 12 are flow charts.

FIG. 21 is a time chart illustrating the signals of the various portion of FIG. 19.

DETAILED DESCRIPTION OF THE PREFERRED EMBODIMENT

Figure 1:
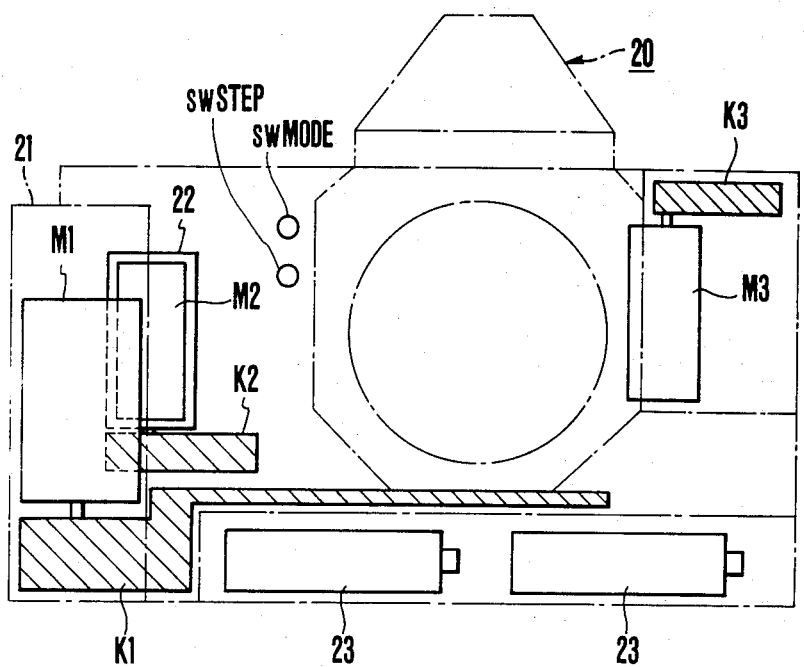

FIG. 1 shows how three electric motors M1 to M3 are arranged within a camera housing as viewed from the front thereof. The motor M1 governs charging of a shutter, a diaphragm adjusting mechanism, a diaphragm drive mechanism and a mirror mechanism, and is put in a left hand front corner of the camera 20 as viewed from the front. As for the charge motor M1, though the load change due to the environmental factors is small, a relatively large driving torque is required, because the absolute load is large. Hence, it takes necessarily a large size. From this reason, the left hand front corner is protruded in the form of a grip 21 to create therein a space the charge motor M1 occupies. K1 is a charge transmission system for the charge motor M1. The windup motor M2 occupies a space within a spool structure 22 and is arranged adjacent to a windup transmission system K2. The rewind motor M3 has its place near a cartridge chamber on the right hand side of a mirror box, and is arranged adjacent to a rewind transmission system K3. An electrical power source 23 consists of four AA type batteries.

Figure 2:
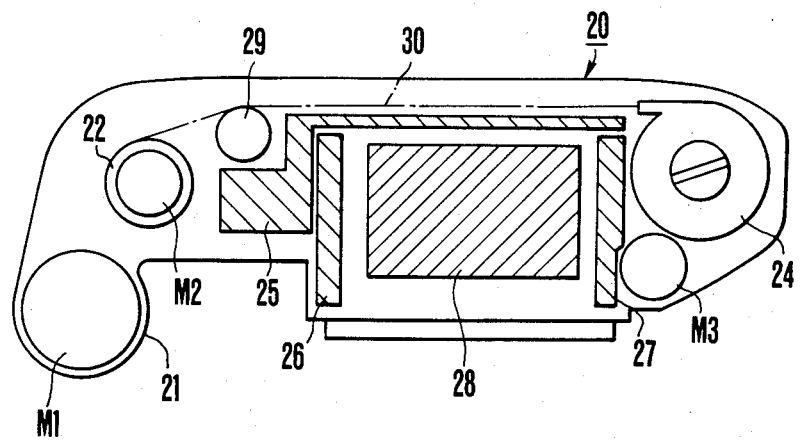

FIG. 2 is a plan view looked from the above of the camera 20 of the arrangement of the motors M1 to M3 along with a film cartridge 24, a blade type vertically running shutter 25, a mirror mechanism 26, an adjusting mechanism 27 for a diaphragm in a lens mounting, a drive mechanism 28 for the diaphragm and a sprocket structure 29 for indexing the fed amount of film 30.

Figure 3:
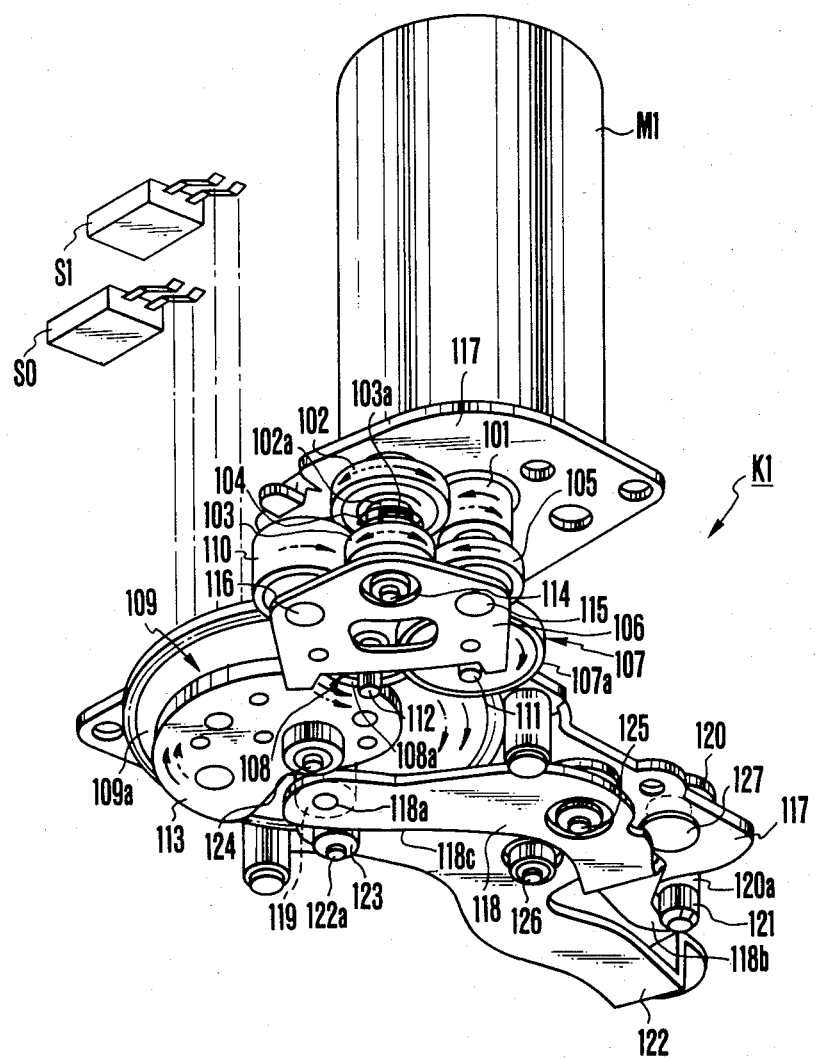

In FIG. 3, there is shown the detail of the charge motor M1 and the charge transmission system K1.

A pinion gear 101 is fixed to the output shaft of the charge motor M1, and meshes with a gear 102. The gear 102 and a gear 103 constitute a 2-stage gear, and are each rotatably mounted on a common shaft 114 planted on a base plate 117. Protruded portions 102a and 103a are formed on the gears 102 and 103 respectively, alternating with each other in directions of thrust. By the engagement of these protruded portions 102a and 103a, the gears 102 and 103 move together in engagement in the direction of rotation, but freely move relative to each other in the directions of thrust. Meanwhile, the gear 103 has a surface in contact with a planetary lever 106 pivotal about the shaft 114 and frictionally contacts with the planetary lever 106 by a compression spring 104 arranged between the gears 102 and 103. Thereby, the planetary lever 106 followingly rotates in the direction of rotation of the gear 103. A gear 105 is rotatably mounted on a shaft 115 planted on the planetary lever 106 and always meshes with the gear 103. A 2-stage gear 107 has a large gear 107a and a small gear (not shown) fixedly formed on the upper surface of the gear 107a and is rotatably mounted on a shaft 111 planted on the base plate 117. When the gear 103 rotates in a clockwise direction, and the gear 105 rotates in a counterclockwise direction (indicated by arrow), the planetary lever 106 is turned in the clockwise direction, bringing the large gear 107a into engagement with the gear 105. A gear 108 is rotatably mounted on a shaft 112 planted on the base plate 117 and consists of a large gear 108a and a small gear (not shown) fixedly formed on the upper surface thereof. The large gear 108a always meshes with the small gear of the gear 107. A gear 110 is rotatably mounted on a shaft 116 on the planetary lever 106 and always meshes with the gear 103. When the gear 103 rotates in the counterclockwise direction and the planetary lever 106 turns in the counterclockwise direction, the gear 110 meshes with the large gear 108a. A cam gear 109 is rotatably mounted on a shaft 124 planted on the base plate 117, and has a gear 109a and a cam 113 formed thereon. The gear 109a always meshes with the small gear of the gear 108.

Such a transmission system from the pinion 101 to the cam gear 109 is changed over between two speed reduction ratios depending on the direction of rotation of the motor M1. That is, when the charge motor M1 rotates in the counterclockwise direction, all the parts rotate in a direction indicated by a solid line arrow with the planetary lever 106 turning in the clockwise direction to establish a low speed gear train of large reduction ratio: the pinion gear 101→the gears 102, 103→the gear 105→the gear 107 (large gear 107a, small gear)→the gear 108 (large gear 108a, small gear)→the cam gear 109. Conversely when the charge motor M1 rotates in the clockwise direction, all the parts except the cam gear 109 rotate in the reverse direction indicated by a dashed line arrow, and the planetary lever 106 turns in the counterclockwise direction to establish another or high speed gear train of small reduction ratio: the pinion 101→the gear 102, 103,→the gear 110→the gear 108 (large gear 108a, small gear)→the cam gear 109. For note, these two gear trains are so arranged that the cam gear 109 always rotates in the clockwise direction regardless of which direction the rotation of the charge motor M1 takes.

A first shutter charge lever 118 is pivotally mounted on a shaft 125 planted on the base plate 117 and has one end on which is rotatably mounted a roller 119 about a shaft 118a, the other end of which is formed to a cam 118b. The roller 119 runs on the outer periphery or camming surface of the cam 113 of the cam gear 109, giving the first shutter charge lever 118 a swinging movement that follows the displacement of the camming surface. And, this swinging movement causes the cam 118b also to swing. A second shutter charge lever 120 is rotatably mounted on a shaft 127 planted on the base plate 117, and has a roller 121 rotatable about a shaft 120a. The roller 121 is in engagement with the cam 118b so that the second shutter charge lever 120 can be swung by the swinging of the first shutter charge lever 118. And, the second shutter charge lever 120 charges a publicly known shutter mechanism (not shown).

A lever 122 for charging a publicly known aperture adjusting mechanism, a mirror operating mechanism and a drive mechanism for the diaphragm in a lens mounting, is rotatably mounted on a shaft 126 planted on the base plate 117, and has one end on which a roller 123 is rotatably mounted about a shaft 122a. This roller 123 is in engagement with a cam 118c of the first shutter charge lever 118. Therefore, the lever 122 also swings as the first shutter charge lever 118 swings, thereby the aperture adjusting mechanism, the mirror operating mechanism and others are charged.

A contact member S0 constitutes a switch together with a pulse signal substrate fixed to the cam gear 109 and (not shown) having a comb-like electrically conductive pattern thereon. This switch detects a point in time a little earlier than when the charging by the charge motor M1 is complete.

Another contact member S1 also cooperates with the aforesaid pulse signal substrate to constitute a switch for detecting when the completion of charging by the charge motor M1 is reached.

Figure 4:
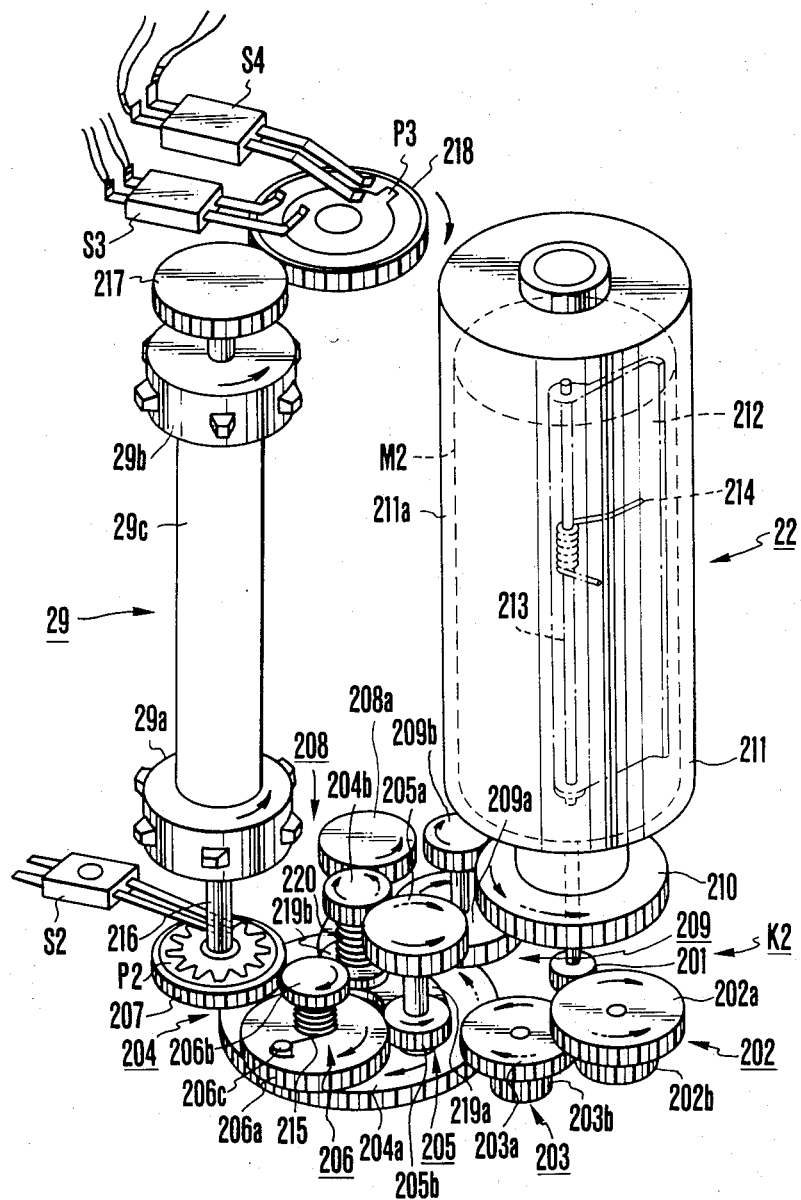

In FIG. 4 there is shown the detail of the windup motor M2 and the windup transmission system K2.

A pinion 201 is fixed to the output shaft of the windup motor M2 arranged in the interior of the spool structure 22. A 2-stage gear 202 has a large gear 202a and a small gear 202b, and is rotatably mounted. The large gear 202a meshes with the pinion 201. Another 2-stage gear 203 having a large gear 203a and a small gear 203b is rotatably mounted and the large gear 203a meshes with the small gear 202b. Another 2-stage gear 204 having a large gear 204a and a small gear 204b is rotatably mounted, and the large gear 204a meshes with the small gear 203b. A planetary lever 219a is rotatably mounted on a common shaft of the 2-stage gear 204 through a bearing 219b. A compression spring 220 is arranged between the small gear 204b and the bearing 219b to bring the bearing 219b and the large gear 204a into frictional contact with each other. By this frictional contact, the planetary lever 219a is caused to turn in the same direction as that of rotation of the gear 204. A 2-stage gear 205 having a large gear 205a and a small gear 205b and another 2-stage gear 208 having a large gear 208a and a small gear (not shown) formed in fixed relation on the lower surface thereof are rotatably mounted on the planetary lever 219a. A 2-stage gear 206 is arranged adjacent the gear 205, and its large and small gears 206a and 206b are rotatably mounted independently of each other. A coil spring 215 is arranged between the large and small gears 206a and 206b with one end of the spring 215 being fixed to a boss 206c of the large gear 206a so that the spring 215 functions as a one-way clutch operating in such a manner that as the large gear 206a rotates in a clockwise direction, the coil spring 215 tightens the shaft portion of the small gear 206b, causing the small gear 206b to be rotated in unison with the large gear 206a. A gear 207 always meshes with the small gear 206b, causing the sprocket structure 29 to rotate by a shaft 216. The sprocket structure 29 comprises sprockets 29a and 29b and a shaft 29c. A pulse signal substrate disc P2 whose entire periphery is divided into 12 equal parts is fixed to the gear 207 so that when the sprockets 29a, 29b rotate one revolution, twelve pulses are obtained through a contact member S2. Because the number of teeth on each of the sprockets 29a, 29b six, and, in the camera of 35mm full size, its 4/3 revolutions advance the film by one frame, therefore, the number of pulses obtained through the contact member S2 is sixteen. Needless to say, it is possible to choose a desired number of divided equal parts for the pulse signal substrate disc P2.

A 2-stage gear 209 is arranged adjacent the gear 208, has a large gear 209a and a small gear 209b and is rotatably mounted. A spool gear 210 is fixed to a spool 211 of the spool structure 22, rotatably mounted, and always meshes with the small gear 209b. The surface of the spool 211 is coated with a rubber member 211a over the entire periphery thereof to promote automatic winding of the leader of the film. Further, a cover 212 is arranged adjacent the outside of the spool 211 to be pivotal about a shaft 213. A spring 214 urges the cover 212 toward the spool 211, thus performing a function of promoting the automatic winding of the film leader on the spool 211. For note, though the cover 211, shaft 213 and spring 214 are shown in only one unit, there is another unit on the opposite side.

Rotation of the sprocket 29b is transmitted to a gear 217 by a shaft connected thereto, and therefrom further to a detection gear 218 meshing with the gear 217. The ratio of the numbers of teeth of the gear 217 and the detection gear 218 is 3:4. A pulse signal substrate disc P3 for producing one pulse for every one revolution is fixed to the gear 218. This pulse is obtained by either of contact members S3 and S4. The contact member S3 is placed ahead the contact member S4 by a prescribed phase. By the pulse from the contact member S3 the drive mode of the windup motor M2 is changed to the duty one, by which the number of revolutions per unit time is lowered, permitting the windup motor M2 to stop rapidly when braked as the pulse from the contact member S4 is later produced.

The control of one cycle of operation of the windup motor M2 by the pulse produced in one revolution of the detection gear 218 results in that, in the case of the camera of 35mm full size, the film is advanced one frame. Though it is as a matter of course, if the ratio of the numbers of teeth of the gear 217 and the detection gear 218 is altered to 3:2, or, if, while the number-of-teeth ratio is left unchanged from 3:4, as the pulse signal substrate P3 is divided into two equal parts, one pulse is produced for every 180° of rotation, the amount of film fed in one cycle can be the half size. Also, if, in this case, the windup motor M2 is otherwise made to stop when two pulses have been counted, the amount of film fed can be returned to the full size. Further, if the number of counted pulses is made to change over between one and two, the feeding of film easily corresponds to either of the full size and the half size.

We explain about the transmission of the torque of the windup motor M2. When the windup motor M2 rotates in the counterclockwise direction, each part rotates in a direction of solid line arrow, and the gear 204 rotates in the clockwise direction, causing the planetary lever 219a to turn in the clockwise direction until the small gear 205b engages the large gear 206a, and, at the same time, the small gear of the gear 208 engages the large gear 209a. Therefore, the rotation of the windup motor M2 is transmitted as the pinion 201→the gear 202 (large and small gears 202a, 202b)→the gear 203 (large and small gear 203a, 203b)→the gear 204 (large and small gears 204a, 204b)→the gear 205 (large and small gears 205a, 205b)→the gear 206 (large and small gears 206a, 206b)→the gear 207→the sprockets 29a, 29b at a speed reduction ratio for slow movement of the film, and at the same time, the gear 204 (large and small gears 204a, 204b)→the gear 208 (large gear 208a and small gear)→ the gear 209 (large and small gears 209a, 209b)→the spool gear 210→the spool structure 22 at the speed reduction ratio for the slow rotation of the spool 211.

Conversely when the windup motor M2 rotates in the clockwise direction, as each part rotates in the direction of dashed line arrow, the gear 204 rotates in the counterclockwise direction, causing the planetary lever 219a to turn in the counterclockwise direction until the large gear 205a engages directly the spool gear 210. Therefore, the transmission system K2 is changed over to the small speed reduction rotio for fast rotation of the spool 211, comprising: the pinion 201→the gear 202 (large and small gears 202a, 202b)→the gear 203 (large and small gears 203a, 203b)→the gear 204 (large and small gears 204a, 204b)→the large gear 205a→the spool gear 210. For note, the sprockets 29a and 29b are cut off from the transmission system K2, becoming freely rotatable.

As will be seen from the foregoing, that part of the transmission system K2 which goes from the windup motor M2 to the spool structure 22 operates with selection of two speed reduction ratios depending on the direction of rotation of the windup motor M2. In more detail, when it is counterclockwise, the speed reduction ratio for the slow speed results. Conversely when clockwise, the other reduction ratio for the high speed results. In either of the directions of rotation, the spool structure 22 always rotates in the counterclockwise direction.

For note, when the film is to be automatically loaded, the windup motor M2 is rotated in the counterclockwise direction, changing the speed reduction ratio of the windup transmission system K2 to the low speed side. So, the sprocket structure 29 and the spool structure 22 are driven to rotate at the slow speed until the light-struck area of the film is moved away from the film gate. After that, for the frame-by-frame advancement of the film that follows the completion of each exposure, if the camera was manually set in either single shooting, or continuous shooting, high speed mode, and the operating condition is normal, the windup motor M2 is then rotated in the clockwise direction, changing over the windup transmission system K2 to the high speed side. Therefore, only the spool structure 22 is driven to rotate at the high speed. If, at a time during the frame-by-frame feeding, the battery voltage drops below the critical level, or the load becomes excessive, the direction of rotation of the windup motor M2 is automatically changed to the counterclockwise, thereby the speed reduction ratio is changed over from the high speed to the low speed. Though the sprocket structure 29 and the spool structure 22 are both driven to rotate, since the speed reduction ratios of the transmission systems to them are so predetermined that the peripheral speed of the spool structure 22 is faster than that of the sprocket structure 29, because the sprocket structure 29 is driven by the film which is pulled by the rotating spool structure 22, there is no problem. Therefore, only when the film is not pulled by the spool structure 22, the sprocket structure 29 takes role of driving the film. In the other situation, the sprocket structure 29 follows up the film regardless of the direction of rotation of the windup motor M2.

Figure 5:
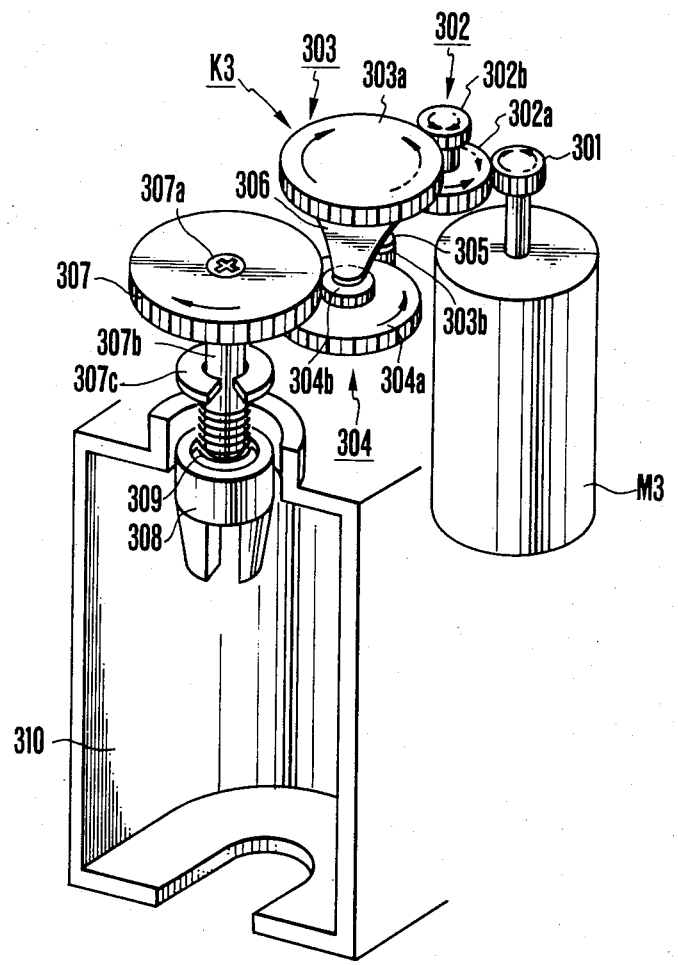

In FIG. 5, there is shown the detail of the rewind motor M3 and the rewind transmission system K3.

A pinion 301 is fixed to the output shaft of the rewind motor M3. A 2-stage gear 302 having a large gear 302a and a small gear 302b is rotatably mounted, the large gear 302a meshing with the pinion 301. Another 2-stage gear 303 having a large gear 303a and a small gear 303b is rotatably mounted, the large gear 303a meshing with the small gear 302b. A planetary lever 306 is pivotally mounted on a common shaft of the gear 303. A compression spring 305 is arranged between the small gear 303b and the planetary lever 306 to bring the planetary lever 306 into frictional contact with the large gear 303a. By this frictional contact the planetary lever 306 is caused to follow up the direction of rotation of the gear 303. Another 2-stage gear 304 having a large gear 304a and a small gear 304b is rotatably mounted on the free end of the planetary lever 306. A gear 307 is mounted on one end of a shaft 307b by a fastener screw 307a, the opposite end of which carries a fork 308. The fork 308 extends into the interior of a cartridge chamber 310, and is arranged to engage with the hub of a supply spool in the cartridge (not shown). A coil spring 309 is arranged between a washer 307c on the shaft 307b and the shoulder of a fork 308 to make it easy to insert the film cartridge into the chamber 310, as the fork 308 can temporarily retract.

When the rewind motor M3 rotates in the clockwise direction, the gear 303 rotates in the clockwise direction, causing the planetary lever 306 to turn in the clockwise direction until the small gear 304b comes to mesh with the gear 307. Therefore, the driving torque is transmitted: the pinion 301→the gear 302 (large gear 302a, small gear 302b)→the gear 303 (large and small gears 303a, 303b)→the gear 304 (large and small gears 304a, 304b)→the gear 307 the fork 308. Conversely when the rewind motor M3 rotates in the counterclockwise direction, the planetary lever 306 turns in the counterclockwise direction, taking the small gear 304b out of mesh with the gear 307. Thus, the driving torque is not transmitted to the fork 308. Therefore, by rendering the rewind motor M3 to turn some angles in the counterclockwise direction, it is made possible not to add the rewind transmission system K3 and the rewind motor M3 to the winding-up load when the windup motor M2 perform the film winding operation. Thus, the load with which the winding-up of the film accompanies can be minimized.

Figure 6:
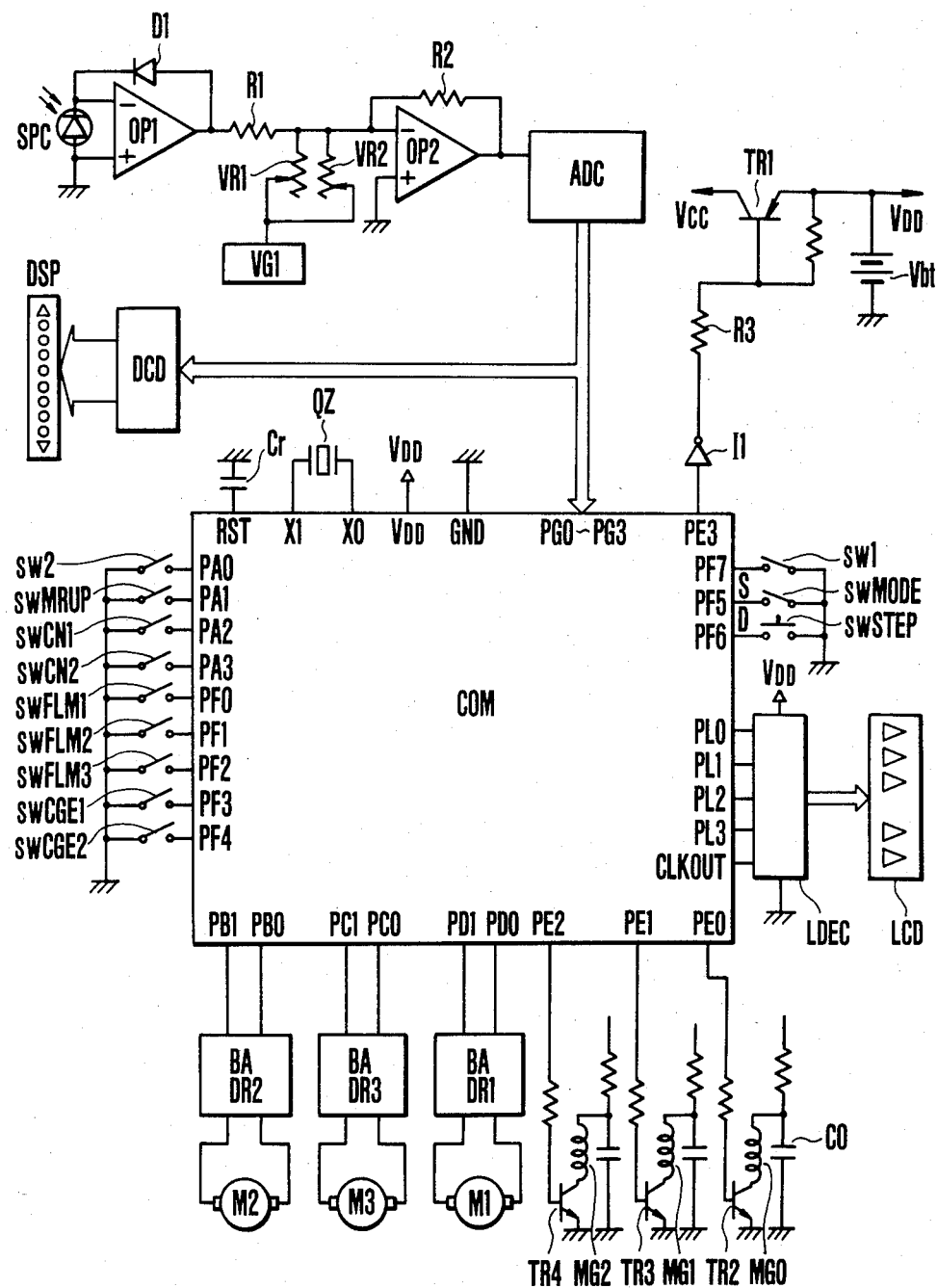

FIG. 6 illustrates a practical example of the electrical circuitry of the camera using a microcomputer COM as control means 402 to be described later.

A photosensitive element SPC receives light from an object to be photographed and produces an output signal which is applied to an operational amplifier OP1 of high input impedance with a compression diode D1 connected in the feedback loop thereof. The operational amplifier OP1 produces an output representing the logarithm of the brightness of the object or brightnesses information Bv through a resistor R1. Two variable resistors VR1 and VR2 are connected to a constant voltage source VG1, producing outputs of film sensitivity information Sv and aperture information Av respectively. Another operational amplifier OP2 with a resistor R2 connected in the feedback loop thereof computes a shutter time information based on the formula: $Tv=(Bv+Sv-Av)$. The shutter time information Tv is converted to a 4-bit digital value by an A/D converter ADC, being displayed by a display device DSP within the finder after the passage through a decoder driver DCD. The output of the A/D converter ADC is also applied to input ports PG0 to PG3 of the microcomputer COM. For note, of the 4-bit codes, 0001 to 1000 correspond to 1/1000 to $\frac{1}{8}$ sec. and the other codes 0000 to more than 1000 correspond to alarming display elements.

When a release button (not shown) is pushed down to a first stroke, a first stroke switch sw1 which is connected to an input port PF7 turns on. Responsive to this, an output port PE3 changes its potential to high level. Then, by an inverter 11 and a resistor R3, a transistor TR1 turns on, thereby the voltage from a battery Vbt is supplied as the electrical power source voltage Vcc to the various circuit portions. An arrow ↑ in the figure represents that Vcc. Even to those circuit blocks which are not marked by that arrow, for example, the operational amplifiers and the A/D converter, the voltage Vcc is supplied as a matter of course. For note, the microcomputer COM, the decoder LDEC and the display device LCD are supplied with another power source voltage $V_{DD}$.

A terminal RST of the microcomputer COM is connected to a capacitor Cr, terminals X0 and X1 to a quartz oscillator QZ, a terminal $V_{DD}$ to the electrical power source $V_{DD}$, and a terminal GND grounded.

Input ports PA0 to PA3 are connected to a second stroke switch sw2 which turns on when the release button is pushed to the second stroke, a mirrorup switch smMRUP which turns off and on when the mirror moves upward and downward respectively, a leading curtain switch swCN1 which turns off when the leading curtain has run down, and on when the charging is complete, and a trailing curtain switch swCH2 which turns off when the trailing curtain has run down and on when the charging is complete.

Input ports PF0 to PF4 are respectively connected to a first film switch swFLM1 comprising the pulse signal substrate disc P2 and the contact member S2 (FIG. 4), a second film switch swFLM2 comprising the pulse signal substrate disc P3 and the contact member S3 (FIG. 4), a third film switch swFLM3 comprising the pulse signal substrate disc P3 and the contact member S4, a first charge switch swCGE1 comprising a pulse signal substrate disc fixed to the cam gear 109 (FIG. 3) and the contact member S0 and arranged to turn on a little earlier than when the charging is complete, and a second charge switch swCGE2 comprising the same pulse signal substrate and the contact member S1 and arranged to turn on when the charging is complete.

Another input port PF5 is connected to a self-drive changeover switch swMODE which turns off when a self-timer mode S is set in, and on when a drive mode D is set in.

Another input port PF6 is connected to a pushbutton type selection switch swSTEP which is pushed when self-times (2 sec. 10 sec.) in the self-timer mode S, or modes (single shooting with high speed, continuous shooting with high speed, continuous shooting with low speed) in the drive mode D are selected. The self-drive changeover switch swMODE and the selection switch swSTEP correspond to setting means 401 (to be described later) in FIG. 13, and are provided in easy-to-operate positions of the camera body, for example, the front surface of the right hand side of the lens.

Output ports PE0 to PE2 are respectively connected to the bases of transistors TR2 to TR4 controlling the current supplies to a first latch magnet MG0 with a permagnet magnet for actuating a mechanical release operation, a leading curtain magnet MG1 for causing the leading curtain to run down, and a trailing curtain magnet MG2 for causing the trailing curtain to run down.

Output ports PB0, PB1 are connected to a drive circuit DR2 for driving the windup motor M2; Output ports PC0, PC1 are connected to a drive circuit DR3 for driving the rewind motor M3; Output ports PD0, PD1 are connected to a drive circuit DR1 for driving the charge motor M1.

Figure 7:
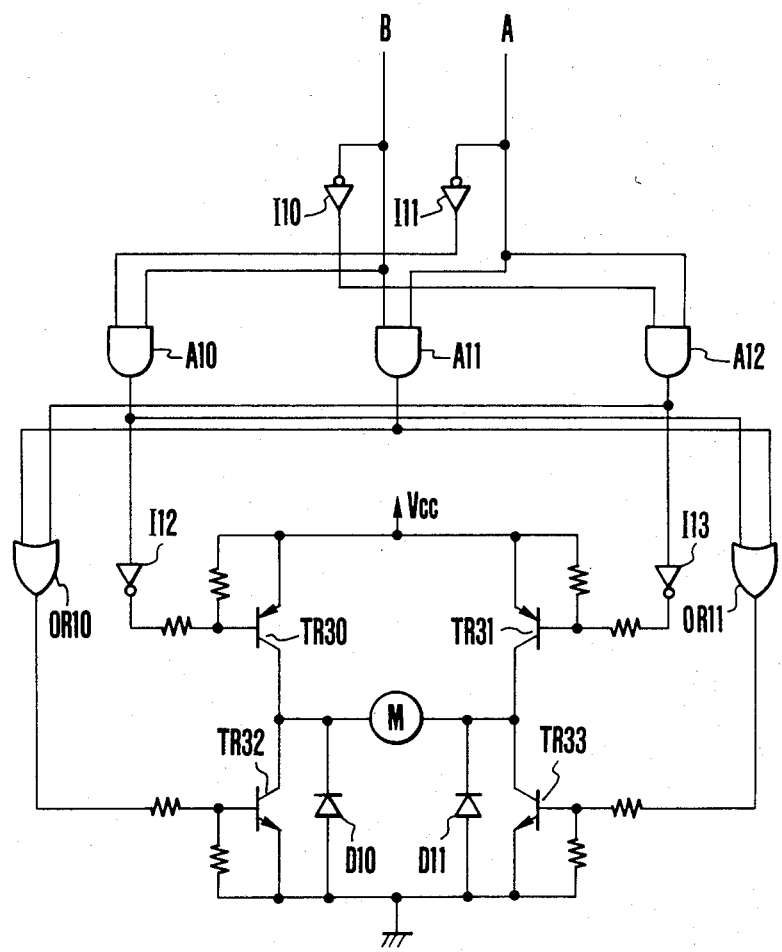

The drive circuits DR1–DR3 are similar in construction to each other. Its circuit construction is shown in FIG. 7. A 2-bit signal enters input terminals A and B. At first, suppose A=1, B=0, then, because the signal of the input terminal B is inverted by an inverter I10, the output of an AND gate A12 becomes 1, and the output of an OR gate OR10 also becomes 1, thereby a transistor TR32 is turned on. Also, because the output of an inverter I13 becomes 0, a transistor TR31 also turns on. Therefore, the electrical power source voltage Vcc is applied to the motor M, and the motor M rotates in the prescribed direction.

When A=0, B=1, because the signal of the input terminal A is inverted by an inverter I11, the output of an AND gate A10 becomes 1 and the output of an OR gate OR11 also becomes 1, and the output of an inverter I12 becomes 0, thereby transistors TR30 and TR33 are turned on. A reverse current flows to the motor M and the motor M rotates in the reverse direction.

When A=1, B=1, the output of an AND gate A11 becomes 1, and the outputs of the OR gates OR10, OR11 also become 1, thereby the transistors TR32 and TR33 are turned on. Therefore, this mode takes place during the time when the motor M is rotating, the current supply is cut off by diodes D10, D11 and the transistors TR32 and TR33, regardless of in whichever direction the motor M rotates, and moreover, both ends of the winding of the motor M are short-circuited to brake the motor M against its inertial rotation.

When A=0, B=0 are become, the outputs of all the AND gates A10 to A12 become 0, and all the transistors TR30 to TR33 are turned off, putting the motor M in open state.

Returning to FIG. 6, from output ports PL0 to PL3 a 4-bit binary signal of a register RL in the microcomputer COM is produced. From an output port CLKOUT a train of clock pulses of as low a frequency as about 2 Hz obtained by dividing the master frequency of the quartz oscillator QZ is produced. These output ports are connected to the decoder LDEC, and the decoder LDEC is connected to the display device LCD constructed with liquid crystal and others. The display device LCD is provided on the upper panel of the camera housing or within the finder.

Figure 8:
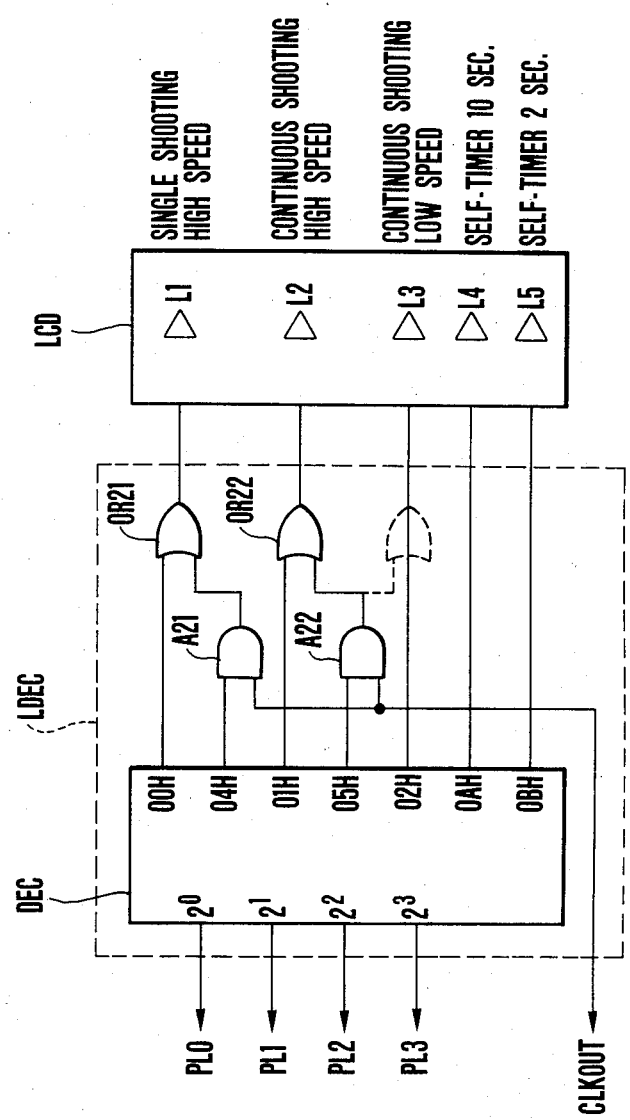

In FIG. 8, there is shown the detail of the decoder LDEC and the display device LCD. The decoder LDEC comprises a binary-hexadecimal decoder DEC, AND gates A21, A22 and OR gates OR21, OR22. The binary-hexadecimal decoder DEC converts the binary 4-bit signal to a hexadecimal number as shown in FIG. 9. The display device LCD lights on either continuously, or intermittently, at the one of display elements L1 to L5 which corresponds to that hexadecimal number. The blinking of the display element L1 represents automatic variation of the speed in the single shooting mode. The blinking of the display element L2 represents automatic variation of the speed in the continuous shooting mode. The OR gates OR22 may otherwise be connected as indicated by dashed line in FIG. 8 so that the automatic variation of the speed in the continuous shooting mode is alarmed by the display element L3 for the continuous shooting with the low speed.

The operation of the microcomputer COM is described by reference to the flow charts of FIGS. 10 to 12.

Upon supply of the electrical power source volt $V_{DD}$, the microcomputer COM starts to operate. The clock is supplied from the quartz oscillator QZ, and, at the same time, the power-on resetting is effected by a capacitor Cr. An incorporated program counter is initially set to an address No. 0. Hence, the program begins with Start. Also, all flags are assumed to be 0, and all the output ports also to be 0.

Step 1

An input enters at the input port PF7. (This input will hereinafter be called "PF7 input", and the same holds for the other ports). If the first stroke switch sw1 is ON, the flow advances to step 2. If OFF, it advances to a mode handling shown in FIG. 12.

Step 2

The output port PE3 produces a signal of high level, turning on the transistor TR1 (FIG. 6) so that the electrical power source voltage Vcc is supplied to the various portions.

Step 3

The PA input enters. If the charging of each portion is complete, and the photographer pushes the release button to the second stroke, PA0=PA1=PA2=PA3=0 results. Therefore, the PA input has a value of 00H in the hexadecimal number system. If the PA input is 00H, a release sequence is executed, advancing to step 4. If not so, return to Step 1. In short, when the first stroke switch sw1 only is ON, the Steps 1 to 3 repeat themselves, only performing the measurement of light and its display.

Step 4

The Apex value of the shutter time Tv (PG input) obtained from the 4-bit digital value by the A/D converter ADC is caused to be memorized in the register RG in the interior of the microcomputer COM.

Step 5

A branch command due to the data of the 4th bit of the register RL in the interior of the microcomputer COM (see FIG. 9). If the data of the 4th bit is 1, because it is the self-timer mode, the flow advances to step 6. If 0, jump to step 9.

Step 6

A branch command due to the data of the 1st bit of the register RL. If this data is 0, representing that the self-timer is set to 10 sec., the next step 7 follows. If 1, representing that the self-time is 2 sec., jump to step 8 occurs.

Step 7

The timer is permited to count 10 sec.

Step 8

The timer counts 2 sec.

Step 9

Change the PE0 output to 1, turning on the transistor TR2 (FIG. 6). The capacitor C0 which has been charged to a voltage almost equal to the electrical power source voltage Vcc is discharged to the first latch magnet MG0. Thereby, the mechanical release operation is initiated. After that, a waiting time TIME1 is made by a constant time timer. When this time is up, the PE0 output is changed to 0, releasing the current supply to the first latch magnet MG0. This waiting time TIME1 may be set to be slightly longer than the minimum time for which the first latch magnet MG0 is supplied with current. Here, the flow enters the mechanical sequence of the publicly known diaphragm-closing-down and mirror-up operations.

Step 10

A routine for waiting time till the mirror up. When the mirror-up is complete, the flow advances to step 11. This routine is provided to insure the mirror-up before the shutter operates.

Step 11

Test the flag F0. F0=1 represents the film end.

Step 12

Test the flag F1. F1=0 represents the approval of the film stop at the time of the windup completion.

Step 13

The content of the register RG which has memorized the shutter time in step 4 is data-converted to a value of multiple series. This is a routine for expanding the data so as to meet the actual control value because the value stored in the register RG is the logarithmically compressed one.

Step 14

Change the PE1 output to 1, causing the leading curtain magnet MG1 to be supplied with current. In this stage, the leading curtain starts to run down.

Step 15

Count the actual time by the data expanded in the step 13, and perform the measurement of the computed shutter time.

Step 16

Change the PE2 output to 1, causing the trailing curtain magnet MG2 to be supplied with current, and the trailing curtain to run down. Now, the control of the focal plane shutter ends. A time TIME 2 necessary for the trailing curtain to complete its running down is made by the constant time timer. After that, by PE1=PE2=0, the current supplies to the leading and trailing curtain magnets MG1 and MG2 are released.

Step 17

A routine for waiting for the turning-off of the trailing curtain switch swCN2, or the completion of the running-down of the trailing curtain. When the running-down is complete, the flow advances to step 18.

Step 18

Examine whether the content of the register RL is smaller than 2 or above 2. From FIG. 9, if it is smaller than 2, either of the single shooting high speed mode and the continuous shooting high speed mode is set in. In either case, the speed reduction ratio has the value for the high speed. So, the flow advances to step 19. In the case of not less than 2, because the speed reduction ratio is for the low speed, jump to step 22 occurs.

Step 19

By PD0=0, PD1=1, the drive circuit DR1 is operated to rotate the charge motor M1 in the direction in which the speed reduction ratio of the charge transmission system K1 (FIG. 3) is changed over to the high speed, so that the charging of the shutter, the mirror, the automatic diaphragm, etc. is effected at a high speed.

Step 20

By PB0=0, PB1=1, the drive circuit DR2 is operated to rotate the windup motor M2 in the direction in which the speed reduction ratio of the windup transmission system K2 is changed over to the high speed, so that the film winding is effected at a high speed.

Step 21

A register RP concerning the duty control just before the completion of winding is caused to memorize a constant number P1 for the speed reduction ratio for the high speed, and a register RM concerning the detection of a lowering of the windup speed is caused to memorize a constant number M1 for the speed reduction ratio for the high speed.

Step 22

By PD0=1, PD1=0, the charge motor M1 is rotated in the direction in which the speed reduction ratio of the charge transmission system K1 is changed over to the low speed.

Step 23

By PB0=1, PB1=1, the windup motor M2 is rotated in the direction in which the windup transmission system K2 is changed over to the low speed.

Step 24

The register RP is caused to memorize a constant number P2 for the speed reduction ratio for the low speed, and a register RM is caused to memorize a constant number M2 for the speed reduction ratio for the low speed.

Step 25

A register RD concerning the detection of a lowering of the windup speed during the period of duty control is caused to memorize a constant number D, another register RS concerning the approval time of the film stop to memorize a constant number S, another register RMM to memorize the content of the register RM, and another register RPP to memorize the content of the register RP. For example, the content of the register RMM becomes the constant number M1 when the speed reduction ratio is for the high speed, or a constant number M2 when it is for the low speed.

Set the flags F0=F2=0, F1=1. The setting of F1=1 means that from now a winding-up operation will start. The flag F2 represents the ON-OFF state of the first film switch swFLM1.

Step 26

Set a constant number K in a timer TMR for the timer interrupt. The value of K is determined by the film winding-up speed, the number of equally divided parts of the pulse signal substrate P2 (FIG. 4) for the first film switch swFLM1 and the instruction cycle time of the microcomputer COM.

Start the timer TMR for the timer interrupt. Also enable the timer interruption. (EN T)

Since the timer TMR has started, it then repeats decrement, independently of the main program routine. So for every constant time (depending on the constant K) interruption takes place to allow for a jump from the program in execution to a specified timer interrupt address. Here, the timer interrupt handling is explained by FIG. 11.

TIMER INTERRUPT HANDLING

Step 101

Stop the decrement operation of the timer TMR, and prohibit the interruption.

Step 102

The PF2 input from the third film switch swFLM3 which turns on each time the film has advanced one frame enters. Assuming here that the windup motor M2 has already been driven in the step 20 or 23, and the third film switch swFLM3 has turned off in the first timer interrupt, then the flow advances to step 103.

Step 103

By the PF1 input from the second film switch swFLM2 which turns on ahead the completion of each cycle of film winding operation, branching is performed. The second film switch swFLM2 is provided for the purpose of improving the accuracy of stop control when the speed of the motor M2 is made to decrease just before the completion of the winding-up. Though, in this embodiment, the decrease of speed is carried out by the duty control, it may otherwise be made by lowering the voltage. Now, assuming that the winding up is not just at the completion, the flow then advances to step 104.

Step 104

By the PF0 input from the first film switch swFLM1 which repeats ON and OFF during the winding-up of the film, branching is performed. Now, on assumption that F0=0, the flow then advances to step 105.

Step 105

Test the flag F2. Since F2=0 has been set in step 25, advance to step 106.

Step 106

After the content of the register RMM is subtracted by 1, the result is again memorized in the register RMM.

Step 107

Test if RMM=0. Since, according to the up-to-now program, RMM=M1 (M2)−1, for the constant M1 (M2) is somewhat large in value, it does not become 0. Advance to step 108.

Step 108

Set again the constant K in the timer register, and start the timer TMR, enabling the timer interrupt handling.

Step 109

Return to the program that was initially executed. The timer interrupt handling has the aim to go testing the three film switches swFLM1, swFLM2 and swFLM3 successively in each constant time from the program that is in progress of execution. All the instructions of the program are executed at a very fast speed. In actual practice, therefore, the successive inputs of film windup informations in the constant times will give rise to no problem.

Now assuming that the turning-off of the first film switch swFLM1 is detected in a certain timer interrupt handling, jump from the step 104 to a step 110 occurs.

Step 110

Test if the flag F2=1. Since F2=0 has been set in the step 25, the next step 111 follows.

Step 111

Set the flag F2 to 1. This means that the first film switch swFLM1 has turned off, or a change to PF0=1 has occurred.

Step 112

If, in the step 105, F2=1 has been detected, for the content of the flag F2 is brought into coincidence with the ON of the first film switch swFLM1, the flag F2 is here set to 0.

Step 113

Set the content of the register RM again in the register RMM. Then, return to the step 108 to execute the aforesaid routine. As the winding is being performed for a while, when the film is advanced to just before one frame, the second film switch swFLM2 turns on with the result that PF1=0. Thus, jump from the step 103 to a step 114 occurs.

Step 114

Examine whether the content of the register RPP is smaller than a constant number P or not less than the P. The register RPP is used for adjusting the duty ratio of the duty control. As has been described in connection with the steps 21, 24 and 25, the content of the register RPP at first has either the constant number P1 (for the speed reduction ratio for the high speed) or P2 (for the speed reduction ratio for the low speed). Because these values are set to be larger than the constant number P, at first advance to a step 115.

Step 115

Set to PB0=1, PB1=1. Thereby, the current supply to the windup motor M2 is cut off, and braking is applied.

Step 116

Subtract 1 from the content of the register RPP, and store the result again in the register RPP.

Step 117

Subtract 1 from the content of the register RD, and store the result again in the register RD. The register RD is used for detecting the film end at a time during the period of duty control. In the step 25, a constant number D has been set therein. The constant number D is assumed to have a somewhat large value.

Step 118

Test if the content of the register RD is 0. Since, it is, at first, not 0, jump to the step 108 occurs, executing the aforesaid routine.

After a number of cycles of the timer interrupt handling have been carried out, when the content of the register RPP falls below the constant number P, the program is branched from the step 114 to a step 119.

Step 119

Examine whether the content of the register RL is smaller than 2 or not less than 2. From the reference to FIG. 9, when smaller than 2, or the speed reduction ratio is for the high speed, the next step follows. When not less than 2, or when it is for the low speed, jump to a step 121.

Step 120

By PB0=0, PB1=1, the windup motor M2 is rotated in the direction in which the transmission system K2 (FIG. 4) is changed over to the high speed, and the high speed winding-up is performed.

Step 121

By the change to PB0=1, PB1=0, the windup motor M2 is rotated in the direction in which the speed reduction ratio of the windup transmission system K2 is changed over to the low speed, and the low speed winding-up is performed.

Step 122

Test if the content of the register RPP is 0. If not 0, return to the step 116 and execute the aforesaid routine. When it becomes 0, advance to a step 123.

Step 123

Store the content of the register RP (constant number P1 or P2) again in the register RPP.

In such a manner, the duty control operates in the steps of putting a certain value to the register RPP, then subtracting 1 from the value in each cycle of timer interrupt (each constant time), cutting off the current supply to the windup motor M2 when the content of the register RPP is more than the constant number P, braking the motor M2, supplying the current to the windup motor M2 when the content is smaller than the constant number P, putting the original value to the register RPP when it becomes 0, and so on repeatedly. Therefore, the duty ratio is determined by the constant K of the timer TMR and the constant P1 or P2 set in the register RPP, and does not depend on the ON-OFF of the first film switch swFLM1.

Also, the content of the register RP is changed when in the speed reduction ratio for the high speed and when in the speed reduction ratio for the low speed in the steps 21 and 24. Therefore, the duty ratio can be chosen respectively independently of each other. Further, if the constant P2 is set to be smaller than the constant P, for example, 0, the flow advances from the step 114 always to the step 119. Thus, it is made possible not to perform the duty control when in the speed reduction ratio for the low speed.

Now assuming that as the deceleration of rotation of the windup motor M2 has been performed, when the winding-up of the film by one frame is complete, the third film switch swFLM3 turns on. At this time, it is in the timer interrupt handling that the flow is branched from the step 102 to a step 124.

Step 124

Set to PB0=1, PB1=1. Thereby the windup motor M2 is de-energized and braked.

Step 125

Similarly to the step 119, examine whether the content of the register RL is smaller than 2 or less than 2. When the speed reduction ratio is for the high speed, advance to the next step 126, and when for the low speed, advance to a step 127.

Step 126

Subtract the constant S1 for the speed reduction ratio for the high speed from the contant of the register RS which has been set to the constant S in the step 25, and store the result again in the register RS. The register RS is used for setting the approval times T1 and T2 when the speed reduction ratio is for the high and low speeds respectively where the approval time is defined by the interval from the moment at which the stop signal has been given to the windup motor M2 to the moment at which the film stop is approved.

Step 127

Similarly to the step 126, subtract the constant S2 for the speed reduction ratio for the low speed from the content of the register RS, and store the result again in the register RS.

Step 128

Examine whether the content of the register RS is smaller than 1, or not less than 1. In the case of not less than 1, because it represents that the approval time T1 or T2 has not yet passed, return to the step 108 and execute the aforesaid routine. When smaller than 1, because the approval time T1 and T2 has expired, advance to the next step 129.

Step 129

As the film is judged to be perfectly stationary, set to the flag F1=0.

Concerning the steps 124 to 129, since the interia of the windup transmission system differs when in the speed reduction ratio for the high speed and when in the speed reduction ratio for the low speed, because the stability time from the production of the stop signal (step 124) of the windup motor M2 to the reach of the film to the perfect stop differs, the approval times T1 and T2 (from the step 124 to the step 129) from the stop signal of the windup motor M2 to the judgement of the stop of the film are correspondingly differentiated from each other by determining different values for the constants S1 and S2 from each other. Therefore, when in the speed reduction ratio for the high speed where the inertia is smaller, the stop of the film can be approved in a shorter time than when in the speed reduction ratio for the low speed where the inertia is larger. Therefore, the next operation can be executed as fast as possible.

After the step 129, the flow returns through the step 109 to the program which is in progress of execution. Here notice that because the step 108 is not entered, an interrupt does not later take place.

We next consider a situation that the electrical power source voltage drops during the driving of the windup motor M2, or that despite the speed reduction ratio for the high speed has been set in, the film winding-up speed is caused to lower by the change of the temperature.

As the film winding-up speed becomes gradually lower, the time interval between the ON-OFF of the first film switch swFLM1 becomes longer. But, the timer interrupt takes place in each constant time. Therefore, the frequency of occurrence of the routine from the step 105 or step 110 to the step 106 increases. Finally, the content of the register RMM becomes 0. In such a manner, the lowering of the film winding-up speed is detected. At this time, the flow advances from the step 107 to a step 130. For note, that value of the register RM which initially sets the register RMM is, because the film winding-up speed differs when in the speed reduction ratios for the high and low speeds, for they must be determined independently of each other, are set to different constants M1 and M2 from each other in the steps 21 and 24.

The time-out routine for detecting the drop of the winding-up speed comprising the steps 104 to 107 and 110 to 113 is not used during the period of the duty control. The reason is that if this time-out routine is allowed to follow the last step 116, 123 of the duty control routine, the number of program steps in the timer interrupt handling becomes so large that the time till to return to the main routine becomes too long to prevent the timing of braking the charge motor M1, for example, from delaying, or situations that lead to a problem in the program that is in progress of execution are encountered.

Therefore, in the period of the duty control, by the steps 117 and 118, it is determined that the film winding-up speed has lowered when the time of the entire period of the duty control is longer than the time dependent on the initially set constant D of the register RD. The flow then branches to a step 130.

Step 130

Examine whether the content of the register RL is smaller than 2 or not less than 2, or the speed reduction ratio is for the high speed or for the low speed. When in the speed reduction ratio for the high speed, advance to a step 131, and when for the low speed, advance to a step 132. With the speed reduction ratio for the high speed, when the film winding-up speed has lowered, the speed reduction ratio is changed over from the high speed to the low speed in order to make it possible to continue the film winding-up. With the speed reduction ratio for the low speed, when the film winding-up speed has lowered, so long as the electrical power source voltage is high enough to make possible the exposure control of the camera, on assumption that the ability to wind up the film with the speed reduction ratio for the low speed is sufficient, there is only the case of the film end.

Step 131

Test the PF4 input representing the state of the second charge switch swCGE2. If the charging is not complete, advance to a step 133. If complete, advance to a step 134.

Step 132

Since the advancing reaches this step when the speed reduction ratio is for the low speed, and the film winding-up speed has dropped, the film end has occurred as has been explained in the step 130. Therefore, by PB0=0, PB1=0, both ends of the winding of the windup motor M2 are opened. Also, to display the film end, the flag F0 is set to 1. Since, after this, the flow returns to the step 109, no subsequent timer interrupt takes place.

Step 133

Because the case is such that the charging is not complete, by the change to PD0=1, PD1=0, the charge motor M1 is rotated in the direction in which the speed reduction ratio of the charge transmission system K1 (FIG. 3) is changed over to the low speed. Thus, the charging is performed at the low speed.

Step 134

By the change to PB0=1, PB1=0, the windup motor M2 is rotated in the direction in which the speed reduction ratio of the windup transmission system K2 (FIG. 4) is changed over to the low speed. Thus, the winding-up is performed at the low speed.

Step 135

Since, in the steps 133 and 134, the speed reduction ratio has been changed over from the high speed to the low speed automatically, the third bit of the register RL (FIG. 9) is set to 1 with alteration to the automatic speed-change mode. At the same time, the content of the register RL is outputted from the ports PL0 to PL3 to the decoder LDEC. Thereby, the display element L1 or L2 (FIG. 8) of the display device LCD is caused to blink, indicating that the camera has been changed over to the automatic speed-change mode.

Since the speed reduction ratio has been changed over to the low speed, the constant P2 for the speed reduction ratio for the low speed is set in the register RP, and the register RPP is initially set to the constant P2. Similarly, the constant M2 for the speed reduction ratio for the low speed is set in the register RM, and the register RMM is initially set to the constant M2.

Also, the register RD is initially set to the constant D.

Next, the flow returns to the step 108, and the aforesaid routine is executed.

Such a timer interrupt handling is always executed from the step 26 of the main routine to the step 12 of the next shooting. Thus, the film windup control is carried out accurately.

We return to the explanation of the main program routine.

Step 27

Test the PF3 input connected to the first charge switch swCGE1. Wait for the turning-on of the first charge switch swCGE1 a little earlier than the completion of the charging, and then advance to a step 28.

Step 28

Examine whether the content of the register RL is smaller than 2 or not less than 2, that is, the speed reduction ratio is for the high speed or for the low speed. When the speed reduction ratio for the high speed or for the low speed is in use, the flow advances to a step 29 or 30 respectively.

Step 29

Because of the speed reduction ratio for the high speed, the charge motor M1 is cut off from the current supply, and braked. Since the charging runs at the high speed, if it were just at the completion of the charging that the charge motor M1 is braked, the inertia of the charge motor M1 would result in continuing its rotation and over-charging. To avoid this, the braking is applied a little earlier than the completion of the charging, so that the charge system stops in the accurately adjusted position when the charging is completed.

Step 30

Wait for the arrival of a "0" signal from the second charge switch swCGE2 which signal represents the completion of charging of the shutter, mirror, automatic diaphragm and others. Then, advance to a step 31. Of course, the timer interrupt handling is carried out repeatedly during the time when the completion of charging is being waited for.

Step 31

Change to PD0=PD1=1. Thereby, the charge motor M1 is cut off from the current supply and braked.

Note that in the steps 27 to 31, because, when the speed reduction ratio for the high speed is in use, the production of the stop signal for the charge motor M1 is started a little earlier than the completion of the charging, the distance the charge load overruns can be shortened.

Step 32

Test the flag F0 representing the film end. Now assuming that the film does not end yet, the flow then advances to a step 33.

Step 33

Examine whether or not the content of the register RL is 1, that is, the camera is set in the continuous shooting high speed mode. If so, jump to NEXT (step 3). From the step 3, as has been described above, the photographic sequence advances. What should be particularly pointed out here is that without certifying the approval of the film stop (flag F1=0) at the time of completion of the winding-up, current is allowed to flow to the first latch magnet MG0 in the step 9. That is, the closing-down of the diaphragm and the mirror-up which are not related directly to the actual exposure are made to operate regardless of the film stop for the completion of the winding-up. Thus, a speed-up is achieved. After that, the mirror-up is certified in the step 10, and the approval of the film stop at the time of the completion of the winding-up is certified in the step 12. Up to this time, the timer interruption repeats itself a reasonable number of times. If the film stop is approved when the winding-up is complete, advance to the next shutter opening control. If, upon arrival at the step 12, the film stop for the completion of the winding-up is not approved yet, the loop of the steps 11 and 12 is repeated, and the approval of the film stop in the timer interrupt handling is waited for. The foregoing is a routine of the continuous shooting high speed mode.

Step 34

In the case of other modes than the continuous shooting high speed mode, wait for the approval of the film stop when the winding-up is complete. (until the flag F1 becomes 0).

Step 35

Test if the content of the register RL is 5, that is, the continuous shooting automatic speed-change mode. If so, jump to NEXT (step 3). If not, advance to a step 36.

Step 36

Test if the content of the register RL is 2, that is, the continuous shooting low speed mode. If so, jump to NEXT. If not, advance to a step 37.

Step 37

Test if the 4th bit of the register RL is 1, that is, the self-timer mode. If so, jump to NEXT. If not, advance to a step 38.

Step 38

Test the PF7 input representing the state of the first stroke switch sw1. Upon waiting for the turning-off of the first stroke switch sw1, return to START. The coming to this step occurs when the single shooting high speed mode, or the single shooting automatic speed-change mode. Therefore, wait for the turning-off of the first stroke switch sw1, that is, the release of the release button from the depression.

In such a manner, when continuous shooting is carried out with the speed reduction ratio set in the low speed, unlike when the speed reduction ratio for the high speed is in use, it is after the film stop has been approved when the winding-up is complete that the next release sequence is made to start. This makes it possible to prohibit the camera from moving abnormally. That is, when the continuous shooting runs at the low speed, it takes a relatively long time to approve the film stop. Because of this, if the release sequence were made to start without certifying the approval of the film stop, the time from the completion of the mirror-up to the opening of the shutter would become too long. This would give the photographer an unpleasant impression. This can be avoided by the steps 34 to 36.

Next, we consider a situation that the film ends in the middle of the winding-up operation.

In this case, the timer interrupt handling results in F0=1, the flow branches from the step 32 to a step 39.

Step 39

Change to PC0=0, PC1=1. Then, the rewind motor M3 is supplied with current through the drive circuit DR3. Thus, a rewinding is started.

Step 40

Set a constant M3 in the register RM.

Step 41 to 48

Similarly to the program for detecting the movement of the film described in connection with the steps 104 to 107 and 110 to 113 of FIG. 11, when the rewinding is complete, the first film switch swFLM1 no longer reverses ON-OFF. This fact is detected by the program of these steps 41 to 48. After the rewinding is complete, advance to a step 49.

Step 49

Change to PC0=1, stopping the rotation of the rewind motor M3.

Step 50

Reset the flag F0 representing the film end to 0.

Step 51

Set the third bit of the register RL to 0. This implies that if the speed reduction ratio was automatically changed to the low speed, it is again automatically changed to the high speed when the rewinding is complete. This is because the photographer usually takes the initial setting at the single shooting high speed mode or continuous shooting high speed mode. When the camera is re-loaded, or when the external situation (particularly temperature) changes largely, the possibility will arise that the film is wound up at the high speed. So, the resetting of the camera to the initial mode is advantageous. After that, return to START.

Next, we consider a situation that during the taking of continuous shooting at the high speed, the charging of the shutter, mirror and automatic diaphragm is completed earlier than usual, but the winding-up is not yet complete, and that after the first latch magnet MG0 has been energized for the next exposure, the film ends.

In this case, since the mechanical release is actuated by the first latch magnet MG0, the diaphragm is closed down and the mirror moves upward. But, the film is stopped in the middle of the cycle of winding operation, and is tensioned as it is no more wound up, leaving the third film switch swFLM3 turned off. Therefore, if the film were rewound without any alteration of that condition, the photographer would mistake it for the shutter opening, and make an erroneous management. Also, if strong light is entering the lens, the film will be fogged. For this reason, it is better to move the mirror downward before the film is rewound.

After the mirror-up has been confirmed in the step 10, the film end is detected by the timer interrupt handling during the time when the approval of the film stop for the completion of the winding-up is waited for in the steps 11 and 12. In the step 132, the flag F0 is then set to 1. Therefore, at the step 11, the flow branches to a step 52.

Step 52

By the change to PD0=1, PD1=0, the charge motor M1 is rotated in the direction in which the charge transmission system K1 is changed over to the low speed of the speed reduction ratio. The direction of rotation of the charge motor M1 may otherwise be made to change over depending on the preset mode. Then, jump to step 30. Upon confirmation of the completion of the charging, the program advances to steps 31, 32 and 39, entering the rewind control.

MODE HANDLING

Figure 10A:
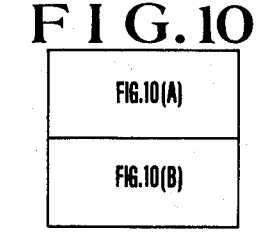
Figure 10A:
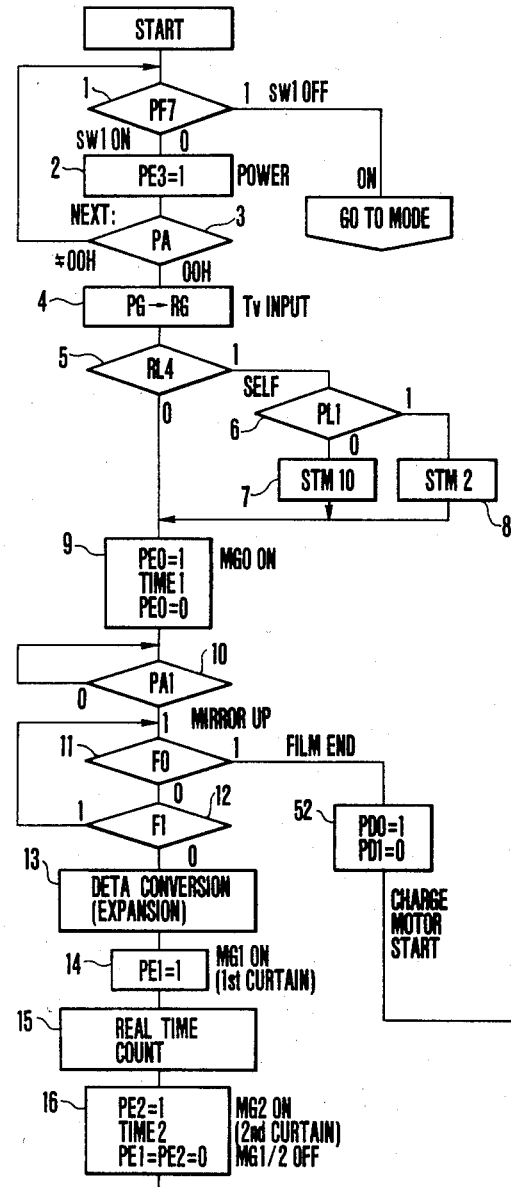
Figure 10B:
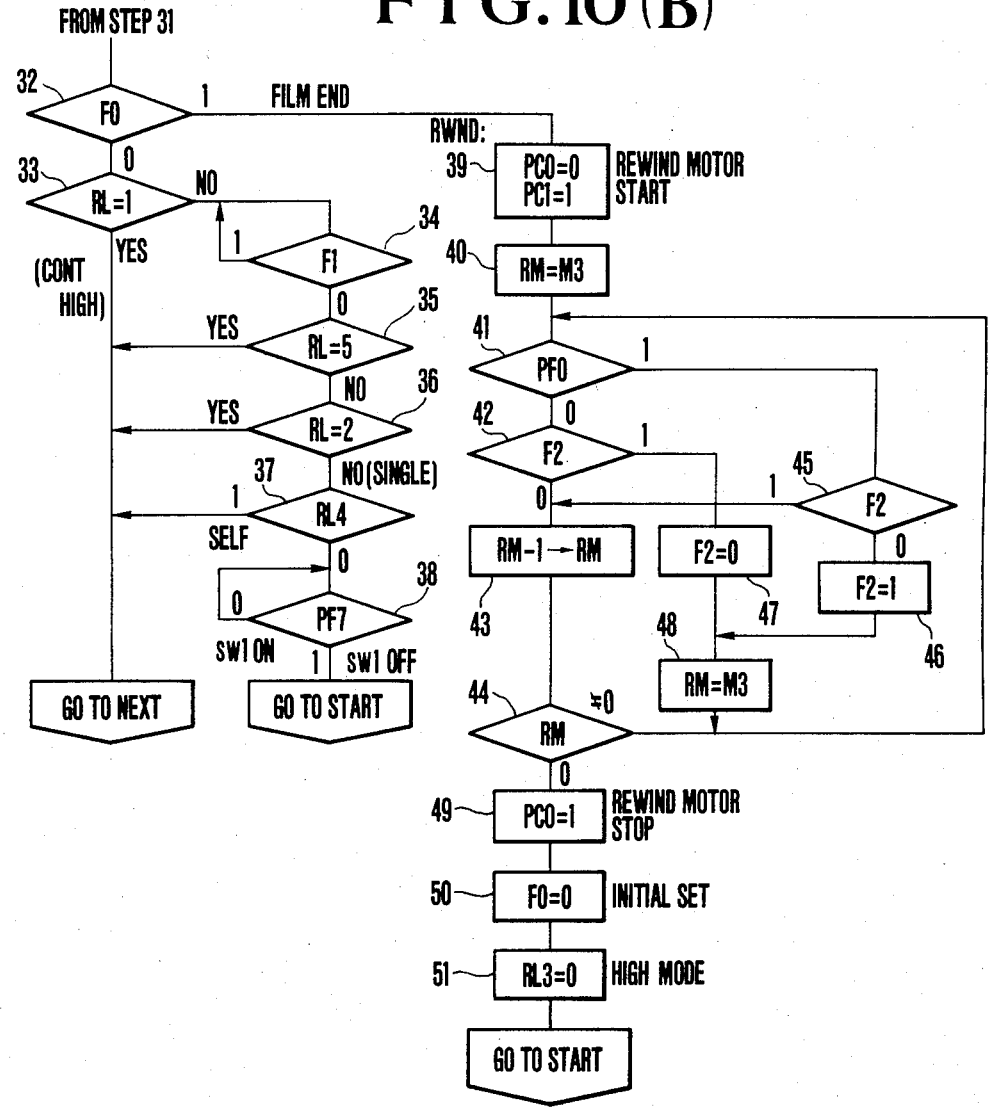
Figure 11:
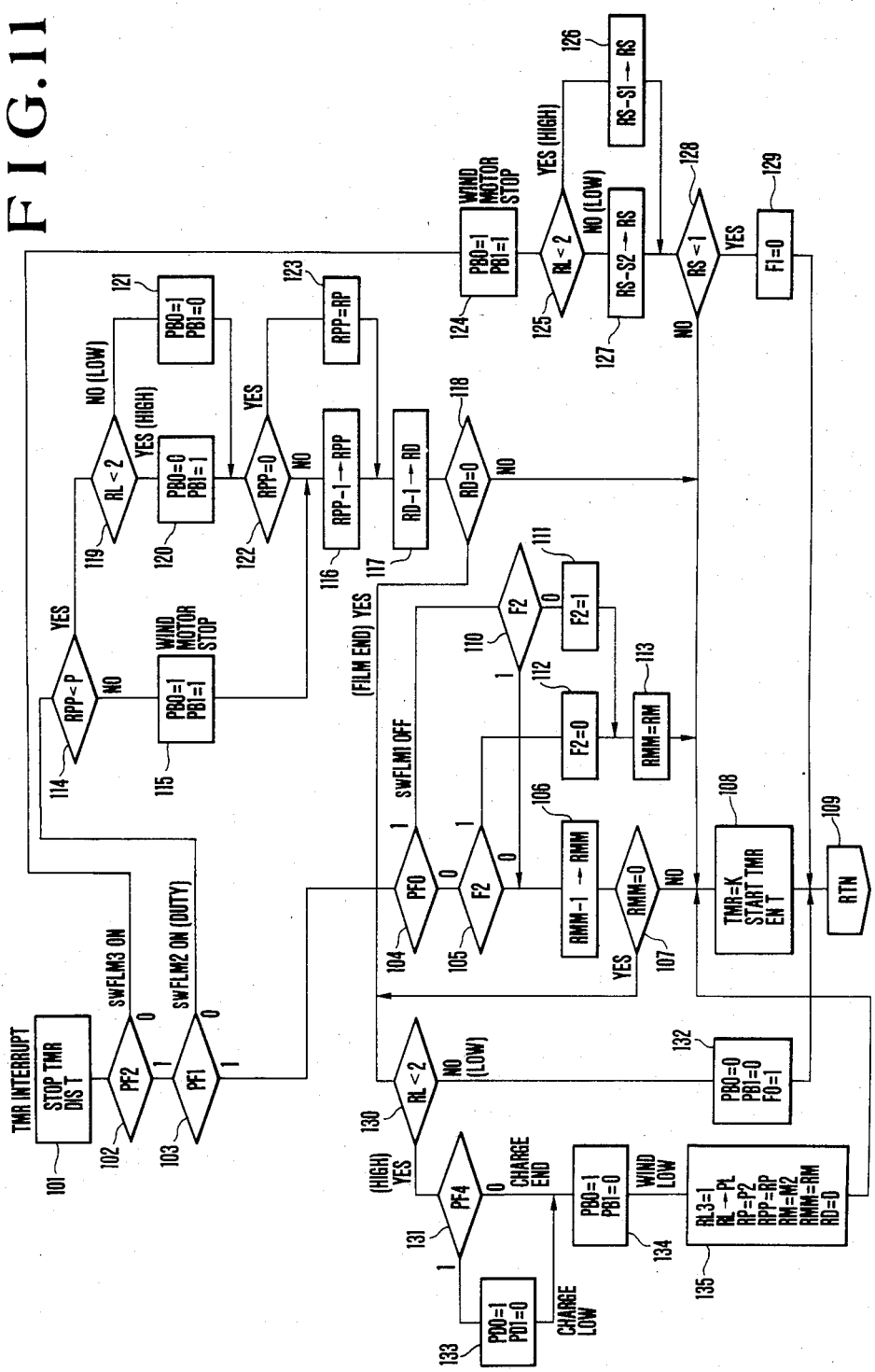
Figure 12:
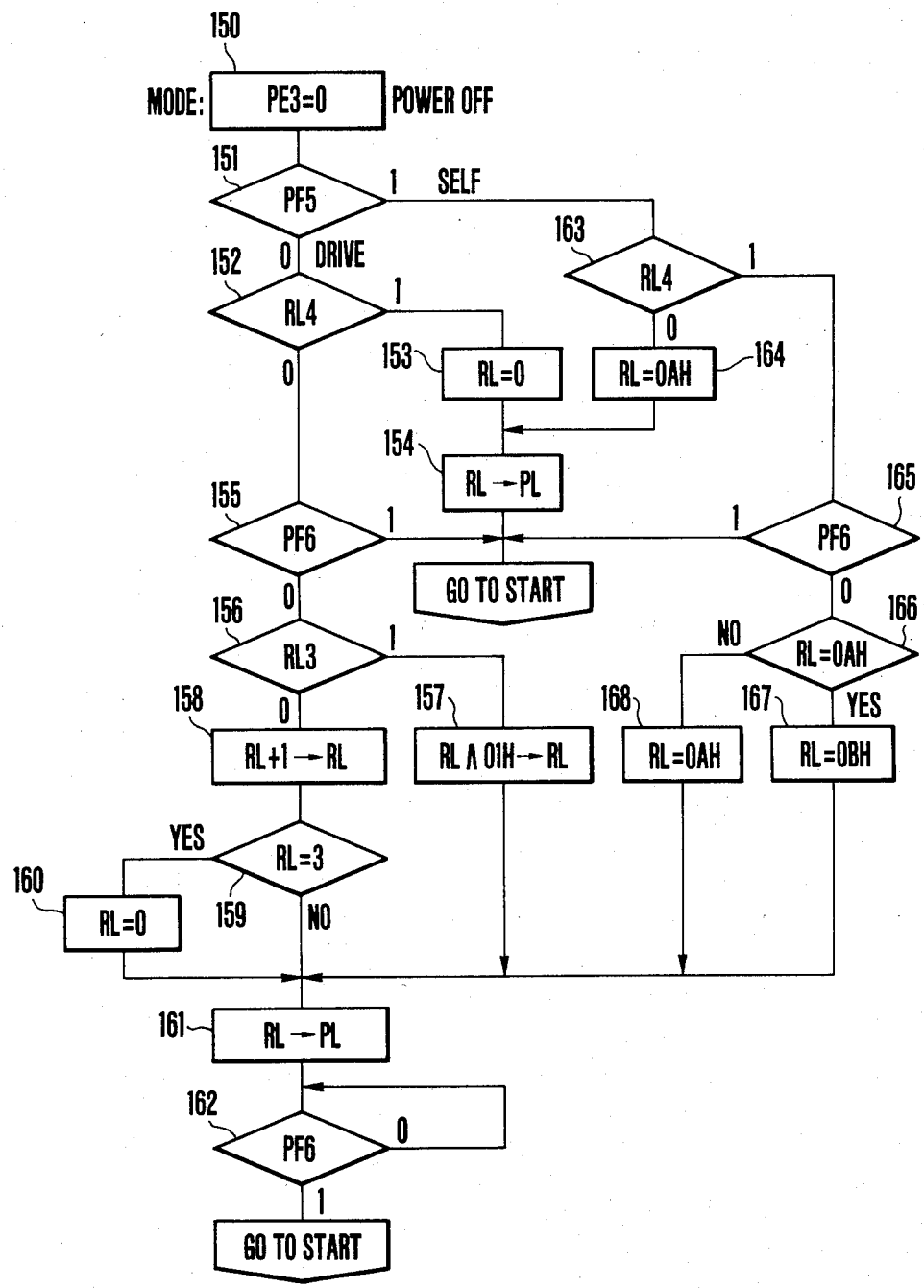

After the first stroke switch sw1 has been determined to be off in the step 1 of FIG. 10, the mode handling shown in FIG. 12 is carried out.

Step 150

Change the output port PE3 to 0. Thereby the transistor TR1 (FIG. 6) is turned off, so that the electrical power source voltage Vcc is turned off. The light metering is stopped to save electrical energy. For note, the electrical power source voltage $V_{DD}$ is alive.

Step 151

Test the PF5 input from the self-drive changeover switch swMODE. If it represents the drive mode, advance to a step 152. If the self-timer mode, advance to a step 163.

Step 152

Test if the fourth bit of the register RL is 1. If so, because the self-timer mode has been set up to that time, advance to a step 153. If 0, because the drive mode has been set, advance to a step 155.

Step 153

The coming to this step implies that the photographer has switched the self-drive changeover switch swMODE from the self-timer mode to the drive mode. Therefore, by setting the content of the register RL to 0, the first of the drive mode, or the single shooting high speed mode, is rendered operative.

Step 154

The content of the register RL is outputted from the ports PL0 to PL3, and displayed on the device LCD. And, return to START.

Step 155

Test the PF6 input from the selection switch swSTEP. When PF6=1, because this implies no changes in both of the self-drive changeover switch swMODE and the selection switch swSTEP, return to START. When PF6=0, because the selection switch swSTEP is being pushed, advance to a step 156.

Step 156

Test if the third bit of the register RL is 1, or the changeover results in the automatic speed change. If the automatic speed changing is effected, advance to a step 157. If not so, advance to a step 158.

Step 157

Compute "AND" of the content of the register RL and 1, and store its result again in the register RL. This means that the second, third and fourth bits are set to 0. Therefore, the automatic speed changing is released. To release the automatic speed changing manually, therefore, the photographer needs only to once push the selection switch swSTEP.

Step 158

When the automatic speed changing is not effected, add 1 to the content of the register RL, and store the result again therein.

Step 159

Test if the content of the register RL is 3. Since RL=3 is not assigned to any mode, the occurrence of 3 implies that all the drive modes are once cycled. If 3, advance to a step 160. If not 3, advance to a step 161.

Step 160

Set the content of the register RL to 0.

The steps 158, 159 and 160 mean that the mode shifting: the single shooting high speed mode→the continuous shooting high speed mode→the continuous shooting low speed mode, is effected each time the selection switch swSTEP is pushed.

Step 161

The content of the register RL is outputted from the ports PL0 to PL3, and displayed on the display device LCD.

Step 162

Wait for the release of the selection switch swSTEP from the depression and then return to START.

Step 163

Test if the fourth bit of the register RL is 1 even when the self-drive changeover switch swMODE is OFF. If 1, because, up to that time, the camera has been in the self-timer mode, advance to a step 165. If 0, because in the drive mode, advance to a step 164.

Step 164

The coming to this step implies that the photographer has changed over the self-drive changeover switch swMODE from the drive mode to the self-timer mode. Therefore, the content of the register RL is set to 0AH in the hexadecimal number system, so that the first of the self-timer modes, or the 10 sec. mode, is rendered operative.

Step 165

Test the PF6 input from the selection switch swSTEP. When PF6=1, because there is no change in both of the self-drive changeover switch swMODE and the selection switch swSTEP, return to START. When PF6=0, because the selection switch swSTEP is being pushed, advance to a step 166.

Step 166

If the content of the register RL is 0AH, advance to a step 167. If not so, advance to a step 168.

Step 167

Store a hexadecimal code 0BH representing 2 sec. mode of the self-timer in the register RL.

Step 168

Store a hexadecimal code "0AH" representing the 10 sec. mode of the self-timer in the register RL.

The steps 166, 167 and 168 means that the self-timer mode is changed over between 10 sec. and 2 sec. each time the selection switch swSTEP is pushed.

Figure 13:
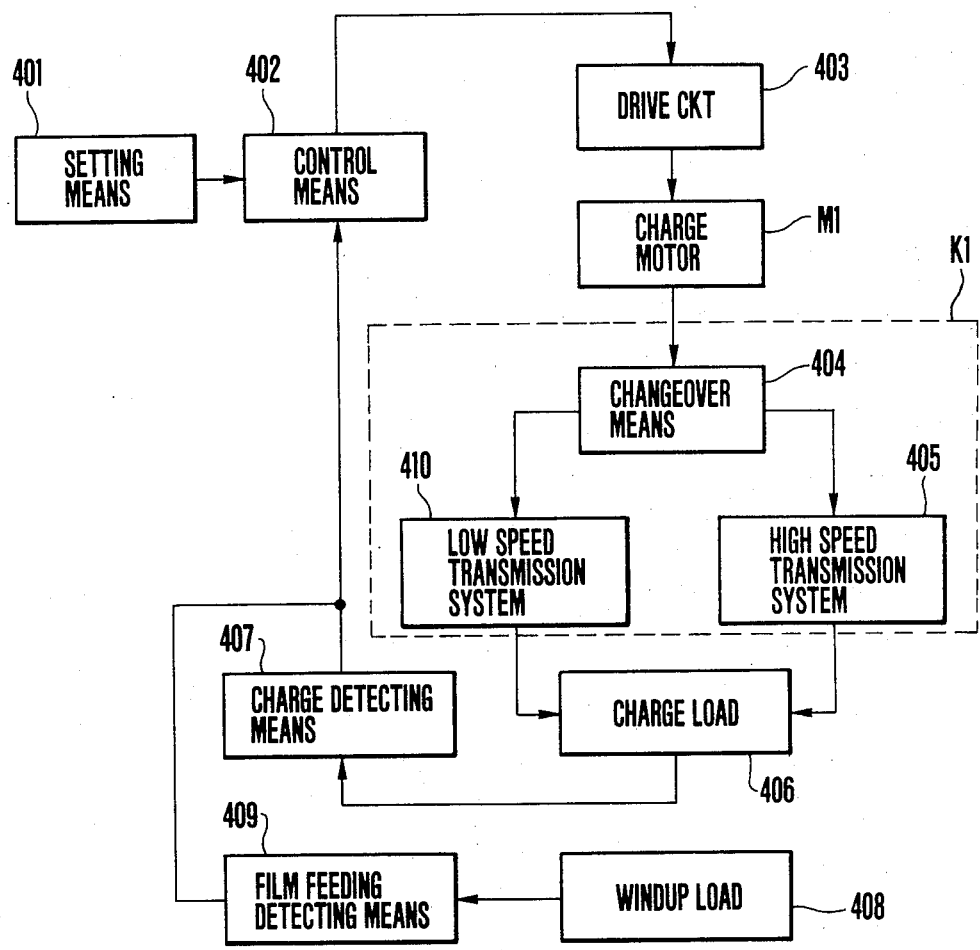
FIG. 13 is a block diagram taken to explain one aspect of the invention.
Figure 14:
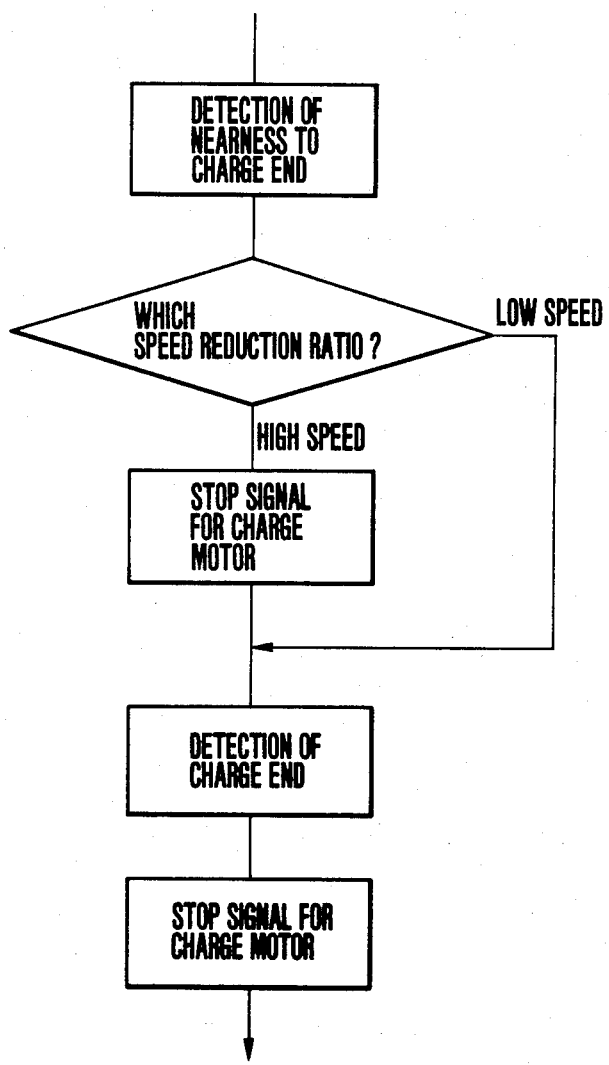
FIG. 14 is a flow chart illustrating part of the operation of FIG. 13.

FIGS. 13 and 14 are taken to explain one aspect of the invention. FIG. 13 is a block diagram taken to explain the operation. The camera is set by setting means 401 in one of a single shooting high speed mode in which the charge and windup transmission systems have normally small speed reduction ratios for the high speed, and are changed over from the small to a large speed reduction ratio in automatic response to lowering of the motor speed, a continuous shooting high speed mode in which the charge and windup transmission systems have normally the small speed reduction ratios, and are changed over from the small to the large speed reduction ratios in automatic response to lowering of the motor speed, and a continuous shooting low speed mode in which the speed reduction ratios of the charge and windup transmission systems are fixed to the large value. Control means 402 performs control according to the preset mode.

In the case of setting the camera in the single shooting high speed mode, as the operating conditions are normal, when the exposure is completed, the control means 402 comprising a microcomputer activates a drive circuit 403 to rotate the charge motor M1 to one direction (for example, normal direction) thereby changeover means 404 is operated to select a high speed transmission system 405 having the small speed reduction ratio. The driving torque of the charge motor M1 is transmitted through the high speed transmission system 405 to a charge load 406. Thus, the shutter mechanism, the adjusting mechanism for the diaphragm in the lens and others are charged. The manner in which the stopping of the charge motor M1 is controlled by the control means 402 differs between when in the small and large speed reduction ratios for the high and low speeds respectively. This is explained by reference to the flow chart of FIG. 14.

When the charge detecting means 407 detects a short time before the completion of charging, the control means 402 examines which value the speed reduction ratio is taking. Since it is now that the single shooting high speed mode is operating, a stop signal for the charge motor M1 is outputted to the drive circuit 403. Responsive to this, the drive circuit 403 stops the current supply to the charge motor M1, and brakes the motor M1. Then, when the charge detecting means 407 detects the completion of charging, the control means 402 continues to produce the stop signal for the charge motor M1. In such a manner, when in the speed reduction ratio for the high speed, the point in time of the start of output of the stop signal for the charge motor M1 is made earlier, so that at the time point of detection of the completion of charging, the braking has already been considerably effective. Therefore, the charge load 406 can be stopped in a short overrun distance from the position of detecting the completion of charging, and the possibility of occurrence of an overcharging can be reduced to zero.

A windup load 408 is driven by a drive circuit, the windup motor and the windup transmission system, but these parts are not shown in FIG. 13. In case when the battery is almost exhausted, or the ambient temperature lowers with the result that the battery voltage falls below a critical level, the speed of rotation of the charge motor M1 decreases. In this case, the speed of rotation of the windup motor M2 also decreases simultaneously, causing the winding-up speed of the windup load 408 to decrease also. With this in mind, the decrease of the speed of rotation of the charge motor M1 is sensed by detecting the decrease of the winding-up speed of the windup load 408. As the control means 402 examines the signal from the film feeding detecting means 409 that detects rotation of the sprocket or the like, when the winding-up speed is determined to have decreased, the control means 402 causes the drive circuit 403 to rotate the charge motor M1 to the other direction (for example, reversed direction). Thereby, the changeover means 404 selects the low speed transmission system 410 having the large speed reduction ratio. Therefore, the driving torque of the charge motor M1 is transmitted through the low speed transmission system 410 to the charge load 406. Thus the charging is performed. The stopping control of the charge motor M1 when with the large speed reduction ratio is started only when the completion of charging is detected. That is, as shown in FIG. 14, despite the charge detecting means 407 detects the short time before the completion of charging, if the speed reduction ratio has been determined to be in the low speed, the control means 402 does not produce the stop signal for the charge motor M1. In such a manner, compared with the high speed mode, the time point of the start of output of the stop signal for the charge motor M1 is made late when in the low speed mode. Because in the low speed mode, the overrun distance is short, such a delay of the stop signal gives rise to no problem. What is rather important is to insure that the charging is soundly performed until the detection of the completion of charging.

For note, though the changeover means 404, the high speed transmission system 405 and the low speed transmission system 410 constitute the charge transmission system K1, the high and low speed transmission systems 405 and 410 may otherwise be constructed with a common part of speed reduction gear train. For the case of this alternative, the changeover means 404 should be changed to the form of being inserted in the middle of the transmission systems 405 and 410.

Even when set in the continuous shooting high speed mode, the charge motor M1 operates in a similar manner to that of the single shooting high speed mode.

When set in the continuous shooting low speed mode, the charge motor M1 operates in a similar manner to that when the speed reduction ratio is automatically changed to the low speed in the single shooting high speed mode.

As has been described above, according to one aspect of the invention shown in FIGS. 13 and 14, it is made possible not only to shorten the distance the charge load overruns from the position at which the commpletion of charging has been detected when in the high speed mode, but also to extend the life time of the electrical power source or battery due to the reduction of the period of current supply to the charge motor M1 per one cycle of charging operation when in the high speed mode.

Figure 15:
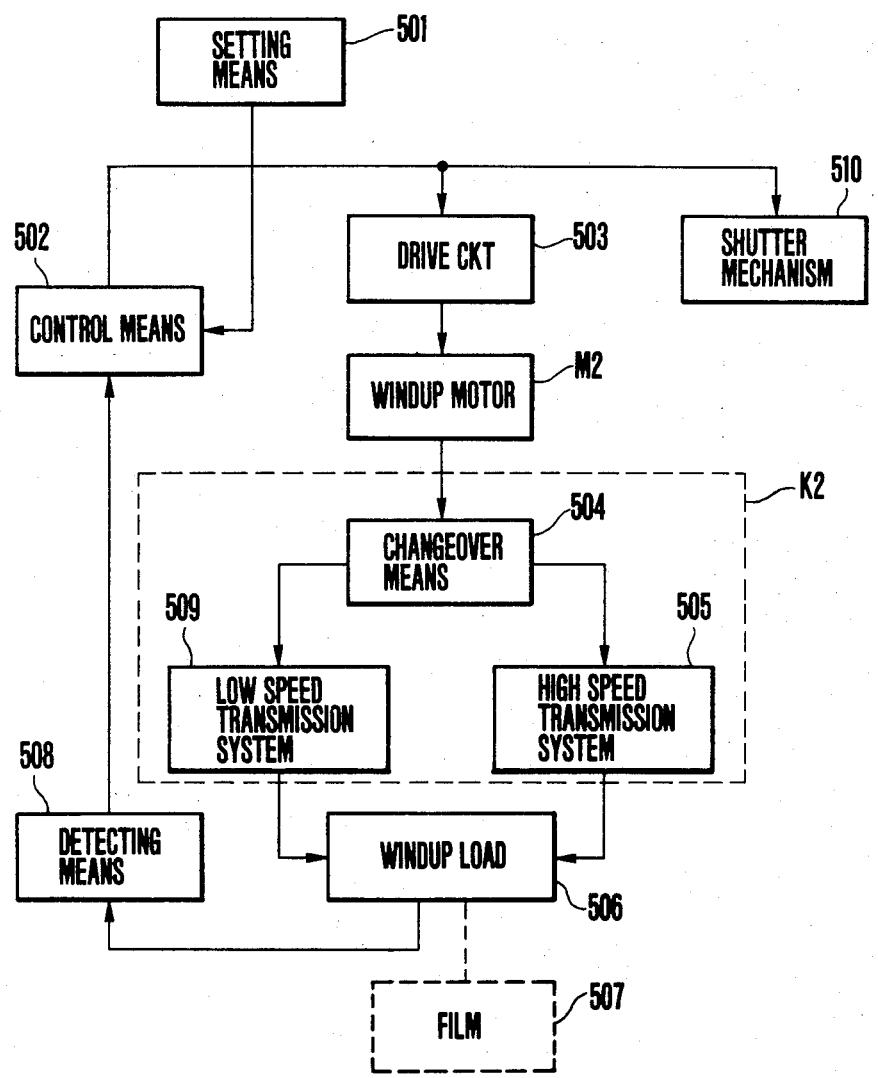
FIG. 15 is a block diagram taken to explain another aspect of the invention.

Another aspect of the invention is next described by reference to FIGS. 15 and 16. FIG. 15 is a block diagram taken to explain the operation.

Such operation includes the single shooting high speed mode in which the windup transmission system normally has a small speed reduction ratio for the high speed, and the speed reduction ratio is changed from the small to a large value in automatic response to lowering of the film winding-up speed, the continuous-shooting high speed mode in which the windup transmission system normally has the small speed reduction ratio, and the speed reduction ratio is changed from the small to the large value in automatic response to lowering of the film winding-up speed, and the continuous shooting low speed mode in which the speed reduction ratio is fixed to the large value are selectively set in the camera by setting means 501. Control means 502 performs control in accordance with the preset mode.

In case when the camera is set in the single shooting high speed mode, as the operating conditions are normal, when to wind up the film, the control means 502 comprising a microcomputer activates a drive circuit 503 to rotate the windup motor M2 to one direction (for example, normal direction), thereby changeover means 504 is operated to select a high speed transmission system having a small speed reduction ratio. The driving torque of the windup motor M2 is transmitted through the high speed transmission system 505 to a windup load 506 including film 507. Thus, the film 507 is wound up at a relatively high speed.

As the windup load 506 becomes heavier, or the voltage of the electrical power source lowers due to the exhaustion of the battery or a large drop of the ambient temperature, detecting means 508 for detecting the rotation of the sprocket or the like produces an output signal representing a lowering of the winding-up speed. Responsive to this signal, the control means 502 causes the drive circuit 503 to rotate the windup motor M2 to the other direction (for example, reversed direction), thereby the changeover means 504 is operated to select a low speed transmission system 509 having a large speed reduction ratio. The driving torque of the windup motor M2 is transmitted through the low speed transmission system to the windup load 506. Thus, the film 507 is wound up at a relatively low speed.

For note, though the changeover means 504, the high speed transmission system 505 and the low speed transmission system 509 constitute the windup transmission system K2, the high and low speed transmission systems 505 and 509 may otherwise be constructed with a common part of speed reduction gear train. For the case of this alternative, the changeover means 504 should be changed to the form of being inserted in the middle of the transmission systems 505 and 509.

In case when the camera is set in the continuous shooting high speed mode, the winding-up of the film is performed through the high speed transmission system. When the completion of winding-up is detected by the detecting means 508, the control means 502 produces a stop signal for the motor M2 which is applied to the drive circuit 503. The drive circuit 503 then stops the current supply to the windup motor M2, and brakes it. But, due to the inertia of the high speed transmission system 505, the film 507 will not stop suddenly. On this account, a longer time than the stabilization time from motor stop signal till the film 507 stops stably is set forth as the approval time from the motor stop signal till the film stop is approved. The elapse of this approval time is taken as the film stop by the control means 502.

This operation of the control means 502 is explained in more detail by reference to the flow chart of FIG. 16. After the control means 502 has given the stop signal for the windup motor M2 to the drive circuit 503, it determines which value of the speed reduction ratio is in use. Since it is now that the continuous shooting high speed mode operates, the corresponding approval time T1 to the small speed reduction ratio for the high speed is selected for counting. Beratio
i cause the inertia of the high speed transmission system 505 is smaller than that of the low speed transmission system 509, the approval time T1 is predetermined to be shorter than another approval time T2 which corresponds to the large speed reduction ratio. The control means 502 approves the film stop by completing the counting of the approval time T1 from the moment at which the motor stop signal has appeared. In the case of the continuous shooting high speed mode, after the completion of charging but before the approval of the film stop, the release sequence is caused to start. That operation which preceds the opening operation of the shutter, or the automatic diaphragm closing down and the mirror upward moving, is performed in parallelism during the approval time T2. Therefore, after the elapse of the approval time T1, the shutter opening operation has already been possible to go. So, the control means 502 immediately starts to control the opening of the shutter mechanism 510 (FIG. 15). For note, the automatic changing of the speed reduction ratio in this mode is operated in a similar manner to that described in connection with the single shooting high speed mode.

In the case of the continuous shooting low speed mode, when the winding-up is performed, the control means 502 produces a motor stop signal in response to detection of the completion of winding-up, and then upon determination of the fact that the speed reduction ratio has the large value, select the corresponding approval time T2 to the large speed reduction ratio for the low speed and counts it. The control means 502 approves the film stop when the counting of the approval time T2 from the motor stop signal is completed.

In the case of the continuous shooting low speed mode, after the film stop has been approved, the release sequence is started. For note, in the continuous shooting high speed mode, if the speed reduction ratio is automatically changed from the high speed to the low speed, the manner of operation becomes similar to that of the continuous shooting low speed mode.

Figure 16:
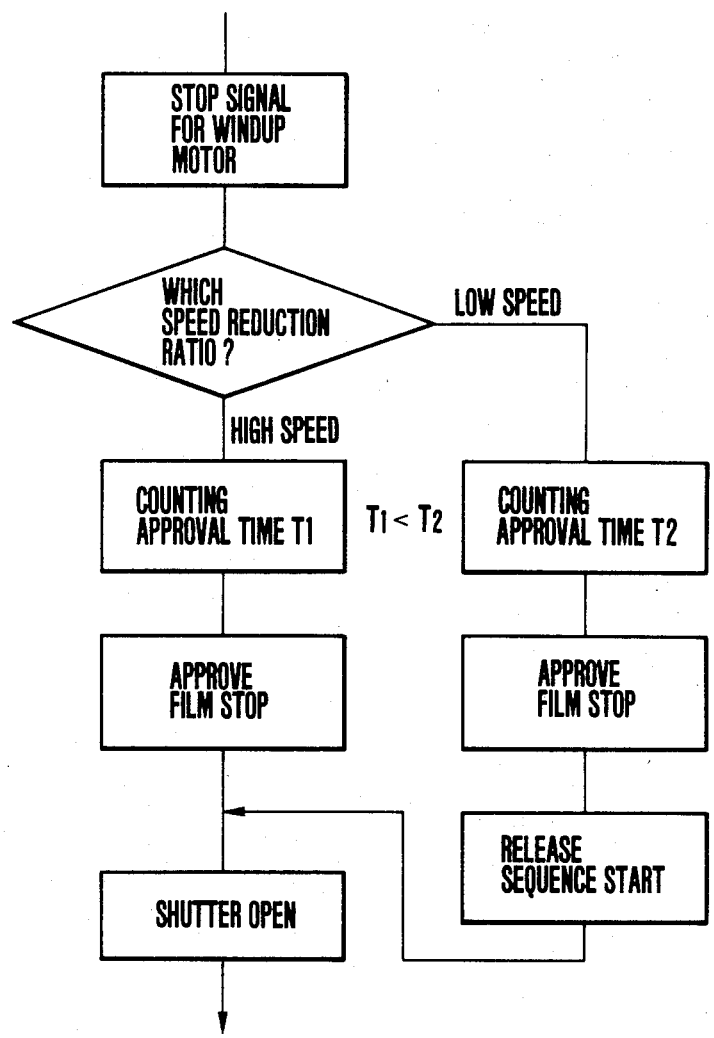
FIG. 16 is a flow chart illustrating part of the operation of FIG. 15.

As has been described above, according to one aspect of the invention shown in FIGS. 15 and 16, when in the continuous shooting high speed mode, the shorter approval time T1 corresponding to the speed reduction ratio for the high speed is selected in order to make it possible that the transition to the shutter opening operation takes place as early as possible. Therefore, the number of frames exposed per unit time can be increased to maximum. Also, since the approval time T1 is determined to a necessary minimum length for the film 507 to stop completely, it is also made possible to remove the necessity of using a mechanical arrangement of the wind stop mechanism. This produces a great advantage on the film windup drive device which has been demanded for ever higher speeds, because the photographing cycle time can be, if not largely, shortened without having to increase the voltage of the battery or heightening the performance of the motor.

Figure 17:
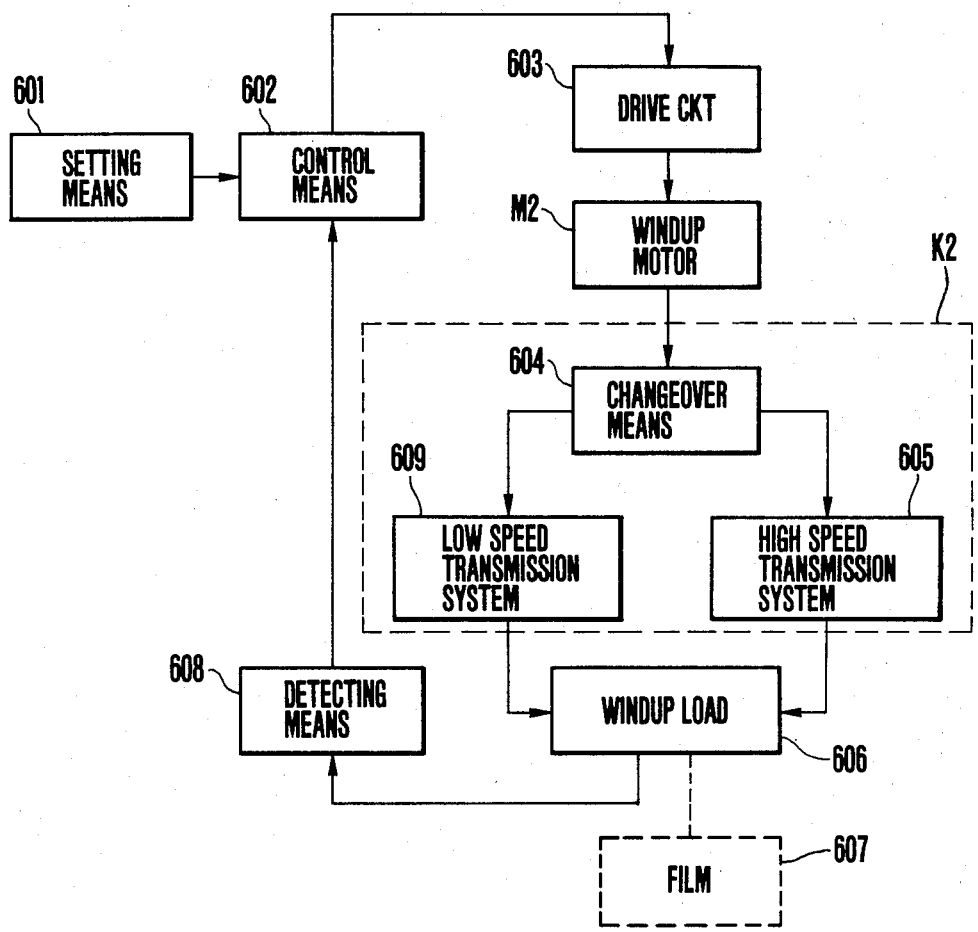
FIG. 17 is a block diagram taken to explain still another aspect of the invention.
Figure 18:
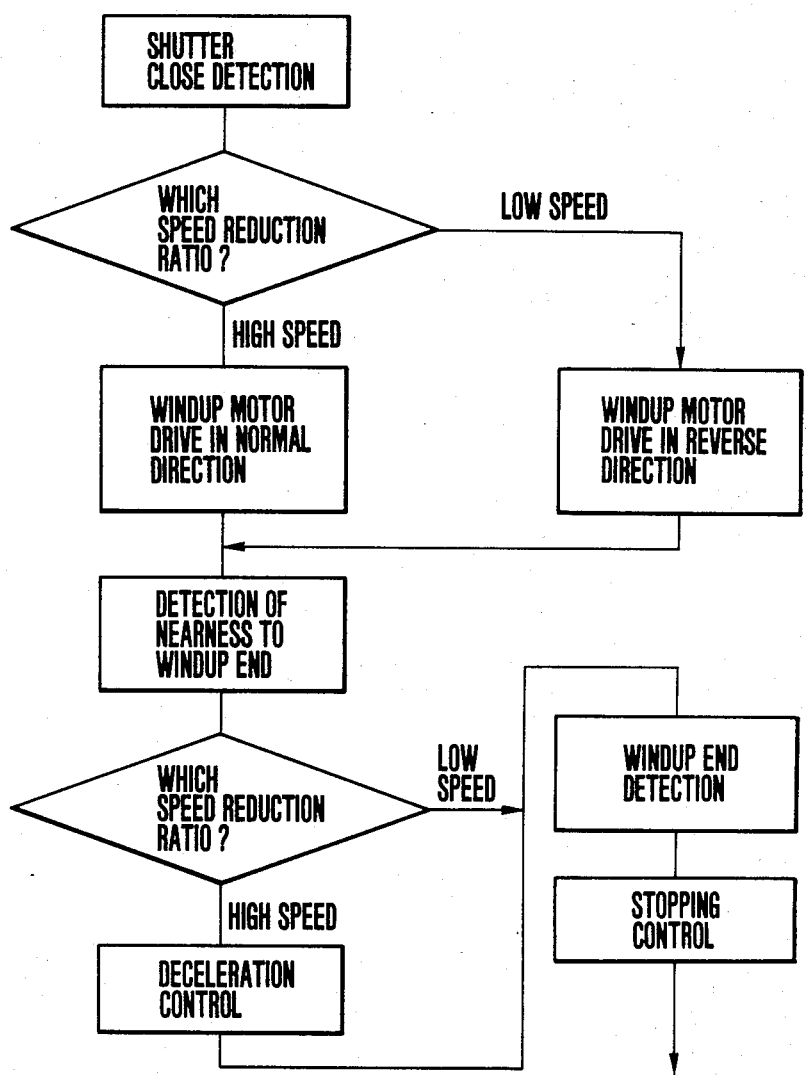
FIG. 18 is a flow chart illustrating part of the operation of FIG. 17.

Still another aspect of the invention is next described by reference to FIGS. 17 and 18. FIG. 17 is a block diagram taken to explain the operation. Such operation includes the single shooting high speed mode in which the speed reduction ratio of the windup transmission system normally takes the small value for the high speed, and is automatically changed from the small value to the large value in response to lowering of the film winding-up speed, the continuous shooting high speed mode in which the speed reduction ratio of the windup transmission system normally takes the small value and is automatically changed from the small value to the large value in response to lowering of the winding-up speed, and the continuous shooting low speed mode in which the speed reduction ratio of the windup transmission system is fixed to the large value are selectively set in the camera by setting means 601. Control means 602 performs control according to the preset mode.

In case when the camera is set in the single shooting high speed mode, for the normal winding-up of the film, the control means 602 comprising a microcomputer activates a drive circuit 603 to rotate the windup motor M2 to one direction (for example, normal direction), thereby the changeover means 604 is operated to select a high speed transmission system having a small speed reduction ratio for the high speed. The driving torque of the windup motor M2 is transmitted through the high speed transmission system 605 to a windup load 606 including film 607. Thus, the film 607 is wound up at a relatively high speed. A little earlier than the completion of winding-up, the control means 602 starts to control deceleration of the windup motor M2. This is carried out only when in the high speed mode, and is not carried out when in the low speed mode. Such a control is explained by reference to the flow chart of FIG. 18.

After the closure of the shutter has been detected by detecting means (not shown), the control means 602 drives the windup motor M2 to the corresponding direction to the value of the speed reduction ratio. When a short time before the completion of winding-up has been detected by detecting means 608, the control means 602 then determines which value, for the high or low speed, the speed reduction ratio is taking. Since it is now that the single shooting high speed mode operates, the control means 602 controls the deceleration of the windup motor M2 by changing the drive signal to the drive circuit 603 in duty fashion or decreasing the level of the drive voltage. After that, when the detecting means 608 detects the completion of winding-up, the control means 602 produces a stop signal for the windup motor M2, controlling the stopping of the windup motor M2. In such a manner, it is when in the high speed mode that the deceleration of the windup motor M2 is made to start from a little earlier time point than the completion of winding-up. Therefore, at the time point of the completion of winding-up, the speed of movement of the film becomes considerably slow, permitting the film 607 to stop in a short overrun distance from the position at which the completion of winding-up has been detected.

As the windup load 606 becomes heavier, or the voltage of the electrical power source lowers due to the exhaustion of the battery or a large drop of the ambient temperature, by the signal from the detecting means 608 for detecting the speed of rotation of the sprocket or the like, the control means 602 determines that the winding-up speed has lowered. Responsive to the output of the control means 602, the drive circuit 603 then renders the windup motor M2 to rotate to the other direction (for example, reversed direction). Thereby the changeover means 604 is operated to select the low speed transmission system 609 having a large speed reduction ratio for the slow speed. The driving torque of the windup motor M2 is transmitted through the low speed transmission system 609 to the windup load 606. Thus, the film 607 is wound up at a relatively low speed. When in the low speed mode, as shown in FIG. 18, despite the detecting means 608 has detected the arrival at the short time before the completion of winding-up, when that the speed reduction ratio for the low speed is in use is detected, the control means 602 does not perform the deceleration control. When the completion of winding-up is detected, the control means 602 performs stopping control of the windup motor M2. In such a manner, when in the low speed mode, the deceleration control is not performed. Therefore, the possibility of occurrence of a stopping of the windup motor M2 before the detection of the completion of winding-up can be reduced to zero.

For note, though the changeover means 604, the high speed transmission system 605 and the low speed transmission system 609 constitute the windup transmission system K2, the high and low speed transmission systems 605 and 609 may otherwise be constructed with a common part of speed reduction gear train. For the case of this alternative, the changeover means 604 should be changed to the form of being inserted in the middle of the transmission systems 605 and 609.

Even when set in the continuous shooting high speed mode, the windup motor M2 operates in a similar manner to that of the single shooting high speed mode.

When set in the continuous shooting low speed mode, the windup motor M2 operates in a similar manner to that when the speed reduction ratio is automatically changed to the low speed in the single shooting high speed mode.

Figure 19:
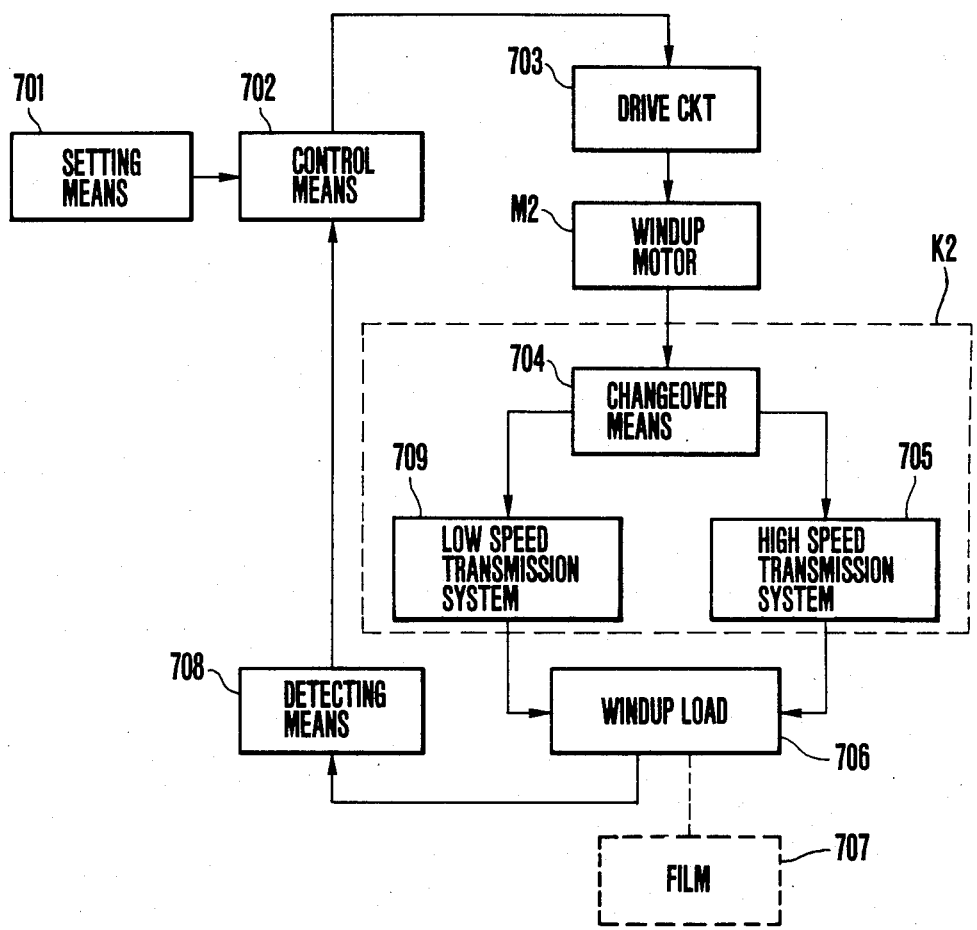
FIG. 19 is a block diagram taken to explain a further aspect of the invention.
Figure 20:
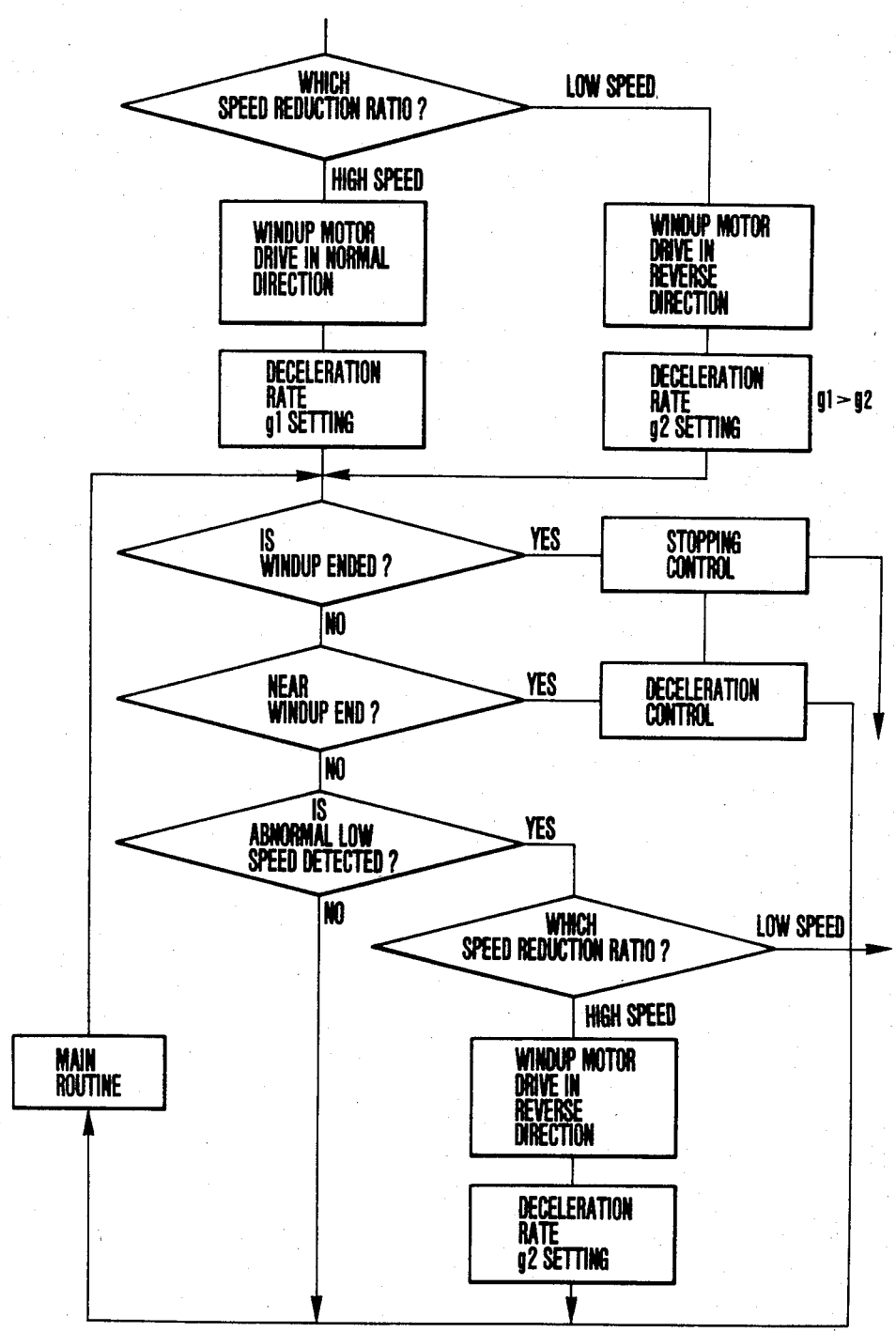
FIG. 20 is a flow chart illustrating part of the operation of FIG. 19.

Another aspect of the invention is next described by reference to FIGS. 19 to 21. FIG. 19 is a block diagram taken to explain the operation. Such operation includes the single shooting high speed mode in which the speed reduction ratio of the windup transmission system normally has a small value for the high speed, and is changed from the small value to a large value for the low speed in automatic response to lowering of the film winding-up speed, the continuous shooting high speed mode in which the speed reduction ratio of the windup transmission system normally has the small value for the high speed and is changed from the small to the large value in automatic response to lowering of the film winding-up speed, and the continuous shooting low speed mode in which the speed reduction ratio of the windup transmission system is fixed to the large value are selectively set in the camera by setting means 701. Control means 702 performs control according to the preset mode.

In case when the camera is set in the single shooting high speed mode or the continuous shooting high speed mode, for the normal winding-up of the film, the control means 702 comprising a microcomputer activates a drive circuit 703 to rotate the windup motor M2 to one direction (for example, normal direction), thereby changeover means 704 is operated to select a high speed transmission system 705 having a small speed reduction ratio for the high speed. The driving torque of the windup motor M2 is transmitted through the high speed transmission system 705 to a windup load 706 including film 707. Thus, the film 707 is wound up at a relatively high speed.

As the windup load 706 becomes heavier, or the voltage of the electrical power source lowers due to the exhaustion of the battery or a large drop of the ambient temperature, when detecting means 708 produces an output signal by detecting the rotation of the sprocket or the like, the control means 702 responsive to this signal representing the abnormal low speed causes a drive circuit 703 to rotate the windup motor M2 to the other direction (for example, reversed direction), thereby the changeover means 704 is operated to select the low speed transmission system 709 having a large speed reduction ratio. The driving torque of the windup motor M2 is transmitted through the low speed transmission system 709 to the windup load 706. Thus, the film 707 is wound up at a relatively low speed.

When the arrival at the short time before the completion of winding-up is detected by the detecting means 708, the control means 702 controls the deceleration of the windup motor M2 by changing the drive signal to the drive circuit 703 in duty fashion or decreasing the level of the drive voltage. When the completion of winding-up is detected by the detecting means 708, the control means 702 produces a stop signal for the windup motor M2, controlling the stopping of the motor M2.

The deceleration control is further explained in detail by reference to the flow chart of FIG. 20 and the time chart of FIG. 21.

When the camera is set in the single shooting high speed mode or the continuous shooting high speed mode, the windup motor M2 is driven to the normal direction, thereby the speed reduction ratio of the windup transmission system K2 is taken at the small value for the high speed. In connection with this, the deceleration rate is set to a value g1 for the small speed reduction ratio. When the camera is set in the continuous shooting low speed, the windup motor M2 is rotated to the reversed direction, thereby the speed reduction ratio of the windup transmission system K2 is taken at a large value for the low speed. In connection with this, the deceleration rate is set to another value g2 for the large value of the speed reduction ratio. The deceleration rate g1 is determined to be larger than the deceleration rate g2.

The deceleration control is carried out along with the abnormal low speed detection, the automatic speed change and the stopping control in the common timer interrupt handling. The timer interrupt handling is performed repeatedly in constant time intervals determined by the timer for interruption during which the main routine is interrupted. In the motor drive period which procedes the deceleration control period, the abnormal low speed detection is carried out by the timer interrupt handling. As shown in FIG. 21, whether or not the pulse period t1 of a winding-up-in-progress progress signal comprising pulses produced for every certain angle of rotation of the sprocket exceeds a detection reference time when in the high speed, or another detection reference time when in the low speed mode is monitored, and the abnormal low speed is detected by the fact that it has exceeded. If this is not detected, the timer for interruption has been set again, and then the flow returns to the main routine. When the abnormal low speed is detected in the abnormal low speed detecting process, the control means 702 determines which of the values for the high speed and the low speed the reduction ratio is taking. When the reduction ratio is taking the value for the high speed, the control means 702 causes the windup motor M2 to rotate in the reverse direction to change over the deceleration rate to the value g2 for the speed reduction ratio of the low speed. After that, the timer for interruption is started, and the flow returns to the main routine. When the reduction ratio is taking the value for the low speed, the abnormal speed is determined as the film end.

Such an abnormal low speed detecting procedure is repeated until the arrival at the short time before the completion of winding-up is detected.

When the arrival at the short time before the completion of winding-up, the control means 702 starts to control the deceleration. FIG. 21 shows an example of the deceleration control by changing the motor drive signal in duty fashion. In this example, when in the high speed mode, the windup motor M2 is energized and deenergized in a time ratio of 1:1, and the deceleration rate g1 has a value of 50%. When in the low speed mode, the windup motor M2 is energized and deenergized in a time ratio of 1:2, and the deceleration rate g2 has a value of 33%. For note, during the deceleration control, the abnormal low speed is detected by another abnormal low speed detection process. But this is not related directly to the invention, and is no more explained here.

In such a manner, the different deceleration rates g1 and g2 are provided for the different individual speed reduction ratios. This enables the deceleration control to be suited to each of the high and low speed modes.

For note, though the changeover means 704, the high speed transmission system 705 and the low speed transmission system 709 constitute the windup transmission system K2, the high and low speed transmission systems 705 and 709 may otherwise be constructed with a common part of speed reduction gear train. For the case of this alternative, the changeover means 704 should be changed to the form of being inserted in the middle of the transmission systems 705 and 709.

Though, in the above-described embodiments of FIGS. 1 to 12, the changeover between the small and large values of the speed reduction ratio of the wind-up transmission system K2 is performed by changing the direction of rotation of the windup motor M2, it may otherwise be performed by using a magnet or the like. Also, though the number of values the speed reduction ratio can take selectively is two, it may be increased to three or more. Further, the deceleration may otherwise be controlled by decreasing the drive voltage of the motor either continuously or stepwise.

Also, though the above-described embodiments each employ three motors M1 to M3 for dividingly driving all operations of the camera, it is to be understood that the present invention is applicable to other types of camera in which there is only one motor for charging, or the winding-up, rewinding and charging are driven by one motor.

What is claimed is:

1. A motorized drive device for a camera, comprising:
   (a) a motor as a rotation drive source;
   (b) a transmission system to be driven by said motor, said transmission system having at least two speed reduction ratios set therein;
   (c) a camera mechanism to be driven by the output of said transmission system;
   (d) first control means for changing over the speed reduction ratio of said transmission system; and
   (e) second control means responsive to changeover of said speed reduction ratio by said first control means for altering the time point of the start of a stopping control of said motor.

2. A camera according to claim 1, wherein the changeover of the speed reduction ratio of said transmission system uses a planetary clutch whose output connection is selected by the change of the direction of rotation of said motor.

3. A camera according to claim 1, wherein as said camera mechanism, a charge structure for charging at least a shutter is used.

4. A camera according to claim 1, wherein said transmission system comprises a high speed transmission system having a small speed reduction ratio and a low speed transmission system having a large speed reduction ratio, and said second control means performs the stopping control of said motor from an earlier time point when said camera mechanism is driven by said high speed transmission system than when driven by said low speed transmission system.

5. A camera according to claim 1, wherein the stopping control by said second control means is performed by short-circuiting both current supply terminals of said motor.

6. A motorized drive device for a camera capable of selecting a continuous shooting mode, comprising:
   (a) a motor as a rotation drive source;
   (b) a transmission system to be driven by said motor, said transmission system having at least two speed reduction ratios set therein;
   (c) film winding-up means to be driven by the output of said transmission system;
   (d) first control means for changing over the speed reduction ratio of said transmission system;
   (e) second control means for performing the stopping control of said motor each time the film is wound up by one frame by said film winding-up means; and
   (f) third control means for controlling the start of a release sequence in the state that said continuous shooting mode is selected, said third control means changing the waiting time from said stopping control by said second control means to the start of said release sequence in response to changeover of the speed reduction ratio of said transmission system.

7. A camera according to claim 6, wherein the changeover of the speed reduction ratio of said transmission system uses a planetary clutch whose output connection is selected by the change of the direction of rotation of said motor.

8. A camera according to claim 6, wherein said transmission system comprises a high speed transmission system having a small speed reduction ratio and a low speed transmission system having a large speed reduction ratio, and said third control means makes said waiting time longer when said film winding-up means is driven by said high speed transmission system than when driven by said low speed transmission system.

9. A motorized drive device for a camera comprising:
   (a) a motor as a rotation drive source;
   (b) a transmission system to be driven by said motor, said transmission system comprising at least a high speed transmission system having a small speed reduction ratio and a low speed transmission system having a large speed reduction ratio;
   (c) a camera mechanism to be driven by the output of said transmission system;
   (d) first control means for changing over the speed reduction ratio of said transmission system; and
   (e) second control means responsive to changeover of said speed reduction ratio by said first control means for altering the control for stopping said motor,
   (e-1) in the state that said transmission system is set in said high speed transmission system, said second control means after having decelerated said motor by duty pulse (intermittent pulse) drive, performing the stopping control;
   (e-2) in the state that said transmission system is set in said low speed transmission system, said second control means performing the stopping control without driving said motor by said duty pulses.

10. A camera according to claim 9, wherein the changeover of the speed reduction ratio of said transmission system uses a planetary clutch whose output connection is selected by the change of the direction of rotation of said motor.

11. A camera according to claim 9, wherein as said camera mechanism, a film feeding structure is used.

12. A camera according to claim 11, wherein said second control means performs said stopping control each time the film is wound up by one frame.

13. A camera according to claim 9, wherein the stopping control by said second control means is performed by short-circuiting both current supply terminals of said motor.

14. A motorized drive device for a camera comprising:
   (a) a motor as a rotation drive source;
   (b) a transmission system to be driven by said motor, said transmission system comprising at least a high speed transmission system having a small speed reduction ratio and a low speed transmission system having a large speed reduction ratio;
   (c) a camera mechanism to be driven by the output of said transmission system;
   (d) first control means for changing over the speed reduction ratio of said transmission system; and
   (e) second control means responsive to changeover of said speed reduction ratio by said first control means for altering the control for stopping said motor;
   (e-1) in the state that said transmission system is set in said high speed transmission system, said control means after having decelerated said motor by driving with the use of first duty pulses (intermittent pulses), performing the stopping control; and
   (e-2) in the state that said transmission system is set in said low speed transmission system, said second control means after having decelerated said motor by driving with the use of second duty pulses (intermittent pulses) of smaller deceleration rate than that of said first duty pulses, performing the stopping control.

15. A camera according to claim 14, wherein the changeover of the speed reduction ratio of said transmission system uses a planetary clutch whose output connection is selected by the change of the direction of rotation of said motor.

16. A camera according to claim 14, wherein as said camera mechanism, a film feeding structure is used.

17. A camera according to claim 16, wherein said second control means performs said stopping control each time the film is wound up by one frame.

18. A camera according to claim 14, wherein the stopping control by said second control means is performed by short-circuiting both current supply terminals of said motor.

* * * * *

UNITED STATES PATENT AND TRADEMARK OFFICE
CERTIFICATE OF CORRECTION

PATENT NO. : 4,699,488

DATED : October 13, 1987

INVENTOR(S) : Masayuki Suzuki et al.

It is certified that error appears in the above-identified patent and that said Letters Patent is hereby corrected as shown below:

Col. 7, line 56, after "307" insert -- --.

Col. 8, line 50, change "smMRUP" to -- swMRUP --.

Col. 10, line 31, after 'The" insert -- master --.

Col. 26, line 60, delete "Beratio".

Col. 26, line 61, change "i cause" to -- Because --.

Col. 30, line 39, delete "progress" second occurrence.

Signed and Sealed this

Thirty-first Day of May, 1988

Attest:

DONALD J. QUIGG

*Attesting Officer*     *Commissioner of Patents and Trademarks*